US012558837B2

(12) United States Patent　(10) Patent No.:　US 12,558,837 B2
Zhao　(45) Date of Patent:　Feb. 24, 2026

(54) SYSTEMS AND METHODS FOR PHOTOPOLYMERIZATION BASED ADDITIVE MANUFACTURING ENABLED BY MULTIPLE-WAVELENGTH IRRADIATIONS

(71) Applicant: UNIVERSITY OF PITTSBURGH—OF THE COMMONWEALTH SYSTEM OF HIGHER EDUCATION, Pittsburgh, PA (US)

(72) Inventor: Xiayun Zhao, Chicago, IL (US)

(73) Assignee: University of Pittsburgh—Of The Commonwealth System of Higher, Pittsburgh, PA (US)

( * ) Notice: Subject to any disclaimer, the term of this patent is extended or adjusted under 35 U.S.C. 154(b) by 330 days.

(21) Appl. No.: 17/437,343

(22) PCT Filed: Mar. 9, 2020

(86) PCT No.: PCT/US2020/021727
§ 371 (c)(1),
(2) Date: Sep. 8, 2021

(87) PCT Pub. No.: WO2020/185690
PCT Pub. Date: Sep. 17, 2020

(65) Prior Publication Data
US 2022/0143906 A1　May 12, 2022

Related U.S. Application Data

(60) Provisional application No. 62/815,801, filed on Mar. 8, 2019.

(51) Int. Cl.
*B29C 64/135*　(2017.01)
*B29C 64/268*　(2017.01)
(Continued)

(52) U.S. Cl.
CPC .......... *B29C 64/135* (2017.08); *B29C 64/268* (2017.08); *B29C 64/277* (2017.08);
(Continued)

(58) Field of Classification Search
CPC .... B29C 64/129; B29C 64/286; B29C 64/277
See application file for complete search history.

(56) References Cited

U.S. PATENT DOCUMENTS

| 2014/0339741 A1* | 11/2014 | Aghababaie | .......... B29C 64/124 264/401 |
| 2020/0001531 A1* | 1/2020 | Moran | .................. B29C 64/393 |
| 2020/0055251 A1* | 2/2020 | Medalsy | ............... B33Y 40/00 |

FOREIGN PATENT DOCUMENTS

| WO | 2017104368 | 6/2017 |
| WO | 2017192033 | 11/2017 |

OTHER PUBLICATIONS

De Beer, et al., Rapid, continuous additive manufacturing by volumetric polymerization inhibition patterning, Science Advances, vol. 5 (Jan. 11, 2019), 8 pages. (Year: 2019).*
Scott, T.F., B.A. Kowalski, A.C. Sullivan, C.N. Bowman, R.R. McLeod, Two-Color Single-Photon Photoinitiation and Photoinhibition for Subdiffraction Photolithography, Science, vol. 324 (May 15, 2009), pp. 913-917. (Year: 2009).*
(Continued)

*Primary Examiner* — Matthew J Daniels
(74) *Attorney, Agent, or Firm* — Paul D. Bangor, Jr.; Clark Hill PLC

(57) ABSTRACT
A system for single photon absorption based vat photopolymerization additive manufacturing with photoinhibition induced curb and photoexcitation induced cure (SPA2CurbCure), comprising: a build chamber; a two-wavelength projection irradiation unit delivering a patterned photo-curbing exposure mask and a patterned photo-curing exposure mask, respectively, to create a curing region of initiating chemicals surrounded by a distribution of inhibiting species; wherein a curing light beam comprising light
(Continued)

BUILD CHAMBER

OPTICS

LIGHT SOURCE λ_CURE → PHOTO-INHIBITING MASK GENERATOR (E.G., DMD OR SLM) → OPTICS → DICHROIC MIRROR OR BEAM SPLITTER

OPTICS

PHOTO-EXCITING MASK GENERATOR (E.G, DMD OR SLM)

LIGHT SOURCE λ_CURB

DMD DIGITAL MICRO-MIRROR DEVICE
SLM SPATIAL LIGHT MODULATOR having a first wavelength and a curbing light beam comprising light having a second wavelength from the irradiation unit are manipulated into adjacent complementary exposures, combined by a dichroic beam splitter and collimated into a target resin material in the build chamber.

9 Claims, 8 Drawing Sheets

(51) Int. Cl.
    *B29C 64/277*         (2017.01)
    *B29C 64/286*         (2017.01)
    *B33Y 10/00*          (2015.01)
    *B33Y 30/00*          (2015.01)
(52) U.S. Cl.
    CPC ............ *B29C 64/286* (2017.08); *B33Y 10/00* (2014.12); *B33Y 30/00* (2014.12)

(56) References Cited

OTHER PUBLICATIONS

Zhao, X. and D.W. Rosen, Real-time interferometric monitoring and measuring of photopolymerization based stereolithographic additive manufacturing process: sensor model and algorithm, Meas. Sci. Technol., vol. 28 (2017), pp. 1-17. (Year: 2017).*

Schwartz, J.J., A.J. Boydston, Multimaterial actinic spatial control 3D and 4D printing, Nature Communications, vol. 10, Article No. 791 (Feb. 15, 2019), 10 pages. (Year: 2019).*

Zhao, Xiayun, Process Measurement and Control for Exposure Controlled Projection Lithography, May 2017, Georgia Institute of Technology, Retrieved from Internet https //smartech gatech edu/ bitstream/handle/1853/58294/ ZHAO-DISSERTATION-2017 pdf, pp. 3-4, figure 1.

* cited by examiner

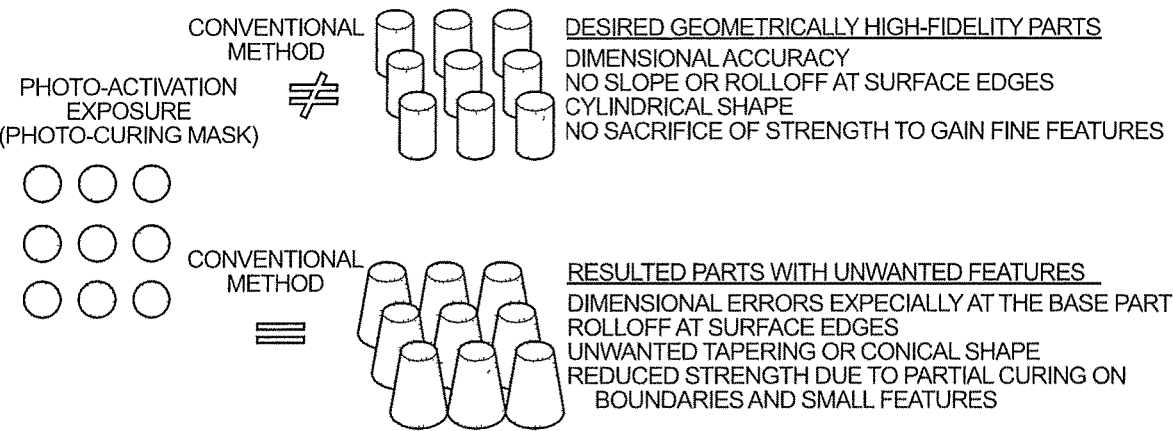

CONVENTIONAL METHOD

PHOTO-ACTIVATION EXPOSURE (PHOTO-CURING MASK)

DESIRED GEOMETRICALLY HIGH-FIDELITY PARTS
DIMENSIONAL ACCURACY
NO SLOPE OR ROLLOFF AT SURFACE EDGES
CYLINDRICAL SHAPE
NO SACRIFICE OF STRENGTH TO GAIN FINE FEATURES

CONVENTIONAL METHOD

RESULTED PARTS WITH UNWANTED FEATURES
DIMENSIONAL ERRORS EXPECIALLY AT THE BASE PART
ROLLOFF AT SURFACE EDGES
UNWANTED TAPERING OR CONICAL SHAPE
REDUCED STRENGTH DUE TO PARTIAL CURING ON
    BOUNDARIES AND SMALL FEATURES

FIG. 1

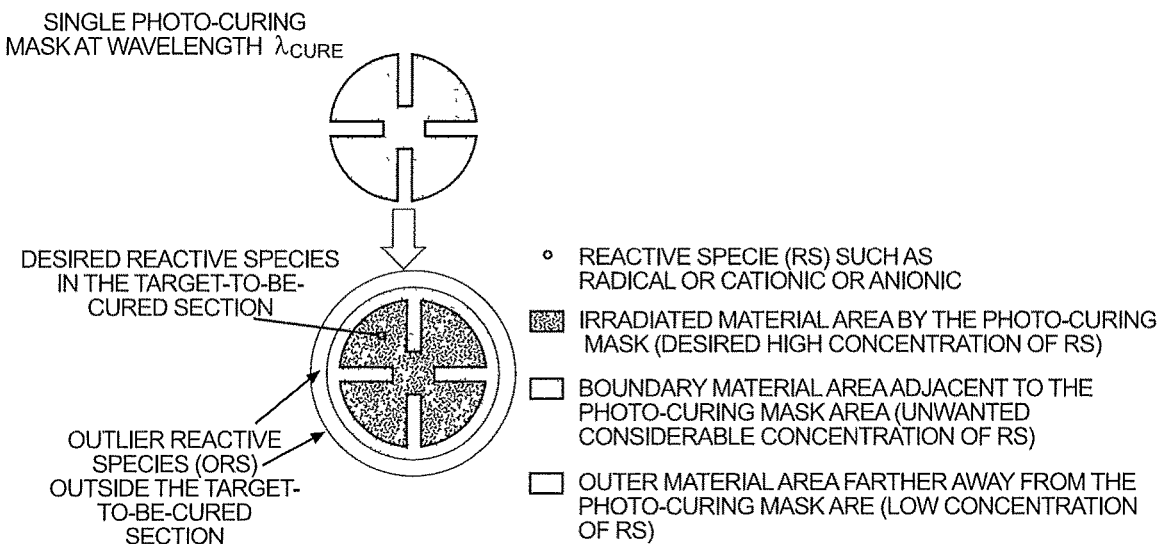

SINGLE PHOTO-CURING MASK AT WAVELENGTH $\lambda_{CURE}$

DESIRED REACTIVE SPECIES IN THE TARGET-TO-BE-CURED SECTION

OUTLIER REACTIVE SPECIES (ORS) OUTSIDE THE TARGET-TO-BE-CURED SECTION

∘  REACTIVE SPECIE (RS) SUCH AS RADICAL OR CATIONIC OR ANIONIC

▨  IRRADIATED MATERIAL AREA BY THE PHOTO-CURING MASK (DESIRED HIGH CONCENTRATION OF RS)

☐  BOUNDARY MATERIAL AREA ADJACENT TO THE PHOTO-CURING MASK AREA (UNWANTED CONSIDERABLE CONCENTRATION OF RS)

☐  OUTER MATERIAL AREA FARTHER AWAY FROM THE PHOTO-CURING MASK ARE (LOW CONCENTRATION OF RS)

FIG. 2

DMD: DIGITAL MICRO-MIRROR DEVICE
SLM. SPATIAL LIGHT MODULATOR

DMD. DIGITAL MICRO-MIRROR DEVICE
SLM. SPATIAL LIGHT MODULATOR

DICHROIC MIRROR
OR BEAM SPLITTER

SYSTEMS AND METHODS FOR PHOTOPOLYMERIZATION BASED ADDITIVE MANUFACTURING ENABLED BY MULTIPLE-WAVELENGTH IRRADIATIONS

RELATED APPLICATION

This application claims priority benefit under 35 U.S.C. § 119(e) of U.S. Provisional Application No. 62/815,801 filed Mar. 8, 2019 the contents of which are herein incorporated by reference.

FIELD OF THE DISCLOSURE

The present disclosure is related to the field of additive manufacturing (AM) wherein physical objects are built from digital three-dimensional (3D) virtual models, featuring freeform design and customized fabrication and, more particularly, photopolymerization AM (PAM) whereby light is used to trigger crosslinking and solidifying of polymerizable materials into complex functional 3D structures.

BACKGROUND

Additive manufacturing (AM) builds physical objects from digital three-dimensional (3D) virtual models, featuring freeform design and customized fabrication. Photopolymerization AM (PAM) offers a versatile portfolio of technologies whereby light is able to trigger crosslinking and solidifying of polymerizable materials into complex functional 3D structures. Photopolymers are able to be processed in a variety of ways and are the most widely used dominant material class in the AM industry. PAM is a mature technology for rapid prototyping and tooling, and is gaining new momentum in the fields of metamaterials, flexible electronics, soft robotics, tissue engineering, bioprinting and 4D printing. Two-photon PAM (TPP-AM) is the most precise AM technology capable of nanofabrication, but has high equipment costs, slow build speeds, limited scalability and low throughput. Single photo absorption PAM (SPP-AM) technologies have realized fast 3D printing of photopolymer parts, but suffer from geometric distortion, dimensional errors, and loss of resolution. Existing SPP-AM technologies cannot fabricate high-fidelity precision objects with exact cross-sectional shapes, nor can it fabricate desired lateral feature sizes and resolutions at the 10s- or even 1 s-micron levels. These drawbacks are primarily due to difficulty in controlling the curing of residual active species, which typically manifests as over-curing and dark-curing that affect the geometric properties of an as-built part. Attempts to avoid over-curing thereby to achieve small features thus far have resulted in weak mechanical strength. According to the present disclosure, it is desirable to provide an affordable multi-scale multi-resolution precision SPP-AM process and corresponding material systems, to produce 3D objects with high-fidelity structures (e.g., no edge deficiency, no over polymerization, no shape tampering), smaller feature size (<20 μm), higher resolution (<20 μm), and unleashed mechanical properties for those high-standard precision applications.

Existing SPP-AM processes emphasize voxel height and cured thickness profile, but do not address the accuracy and precision in the lateral profile. According to the present disclosure, it is desirable to provide a novel single photon absorption based AM process that harnesses photo-inhibition to laterally confine (termed as "curb") the photo-curing of each section profile (SPA2CurbCure) to fabricate complex 3D parts with the features listed above. According to the present disclosure, a light beam with a wavelength different from the photopolymerization light preferably can be applied around the cross-sectional photocuring area to inhibit the presence of reactive species outside the target boundaries, and thereby precisely confine the lateral photocuring. According to the present disclosure, it is desirable to: (1) provide a SPA2CurbCure system with two individual digital light processing systems to deliver dynamic photocuring and photo-curbing exposures, respectively; (2) identify suitable photo inhibition mechanisms and establish corresponding material systems to fulfill SPA2CurbCure; (3) study and characterize the effects of the photo-curbing exposure in cured part properties by multiphysics modeling and experimental characterization; (4) validate SPA2CurbCure by fabricating high-definition artifacts such as micro pillar structures and microscale topological membranes.

In contrast to the advances in PAM that use oxygen inhibition or photo inhibition to control vertical thickness of printed objects, controlling the lateral profile including size, resolution and shape in PAM is an entirely untapped area. According to the present disclosure, it is desirable to exploit photo inhibition to laterally confine PAM and facilitate a comprehensive and effective photo-inhibition scheme to address unwanted polymerizations and associated consequences that are intrinsic to conventional PAM. According to the present disclosure, it is desirable to break the current capability limits (>100 μm laterally without loss of geometric fidelity) in SPP-AM to achieve consistently sub-50 μm printed feature size and resolutions, and unleash mechanical properties without sacrificing crosslinking density for small feature size and high resolution. Furthermore, the preferred methodology of photo curbing of the present disclosure can circumvent issues such as cross excitation, rheology complication, and composition contamination caused by the common practice of overlapping inhibition and initiation irradiations. According to the present disclosure, it is desirable to provide an in-depth analysis of how photoinhibition interacts with the photons, initiators and polymerizable species. The scientific discovery and development of material systems which will catalyze the translation of photochemistry and photo physics into AM capabilities and advanced materials, sparking other novel photo-induction based AM processes and materials.

According to the present disclosure, it is desirable to provide an SPA2CurbCure method that advances the applications of PAM to fabricate sophisticated objects with precision lateral profiles and stringent overall geometric accuracy in diverse high-profile industry applications, for example, delicately-designed meta materials, microscale topologized membranes for energy-efficient filtration, micro-pillar based components, microfluidic biochips, micro lens arrays and flexible electronics.

Additive manufacturing (AM) builds physical objects from digital three-dimensional (3D) virtual models, known as 3D Printing, featuring freeform design and customized fabrication. It can process a wide spectrum of materials including metals, polymers and ceramics to form complex structures and usable parts in various industries such as aerospace, automotive, energy and medical. It grows rapidly during the recent years with huge economic impacts. The worldwide revenues from AM material sales alone exceed 900 million US dollars in 2016, with photopolymer occupying 39% due to its dominant mature AM applications in prototyping and molding [1]. Even though metals and other polymers AM have been gaining increasing industry adoptions, photopolymer remains as the most widely used material class for AM and will embrace more appealing applications especially with the development of AM processes and functional polymers for bioprinting and 4D printing.

Cutting-edge applications in tissue engineering, flexible electronics, and soft robotics demand advanced manufacturing technologies that are capable of producing complex 3D architectures with soft materials such as hydrogels and polymers [2]. Many of these active materials fall into the category of photopolymerizable materials. Photopolymer based additive manufacturing offers a promising fabrication technique to make complex shaped and functional structures and systems.

The most precise photopolymerization AM (PAM) that can create three-dimensional submicron features is based on two-photon polymerization (TPP) process [3-7], which however is too expensive and not able to produce high-throughput parts with limited printing speed, constrained build volume and complicated implementation. Inspired by the nanoscale resolution of TPP, some researchers are interested in developing a compact and affordable alternative to TPP by direct ink writing (DIW) methods which can inhibit the single-photon off-focus photopolymerization by exploiting nonlinearity of single-photon absorption and photoresist's nonlinear photopolymerization threshold [8, 9]. DIW could fairly successfully achieve submicron resolution but is limited in scanning speed, because they require an optical fiber to propagate and focus a continuous wave laser beam to a focal spot 50 µm deep into the photoresist with a high contrast (>100 fold) between foci and legions 5 µm off-focus [9].

Recent advances related to photopolymer based AM include ink jet printing of UV curable functional inks for fabricating electronics [10, 11], a fast photopolymerization based AM technology—the continuous liquid interface production (CLIP)—combining photopolymerization and oxygen inhibition induced deadzone [12], and a volumetric AM technology of printing 3D polymer structures using 3D projection at one shot [13]. These state-of-the-art technologies have advantages in printing speed, but are still confronted with grand challenges in printed resolution, smallest feature size, dimensional accuracy and mechanical strength [14-17]. For example, nowadays, it is not uncommon to see commercial vat photopolymerization AM (PAM) machines labeled with vertical resolution being about 75 µm and the lateral resolution around 70 µm. In reality, none of the existing PAM technologies based on single photo absorption is able to achieve that nominal resolutions at tens of microns, and the best available resolution and smallest feature size attainable is typically over 150 µm. Worse still, resolutions could be further decreased in PAM with high-viscosity materials. Besides the geometric issues (resolution, dimension accuracy), a recent first-time study on the mechanical properties of parts printed by the cutting-edge photopolymer AM technology—CLIP, reveals a 7% deviation in the strength of CLIP printed lattice structure, suggesting another serious technical gap in PAM [17]. To push forward the advancement and adoption of PAM for the abovementioned industries, there is an urgent need for a cost-effective and high-throughput PAM technology which is capable of downsizing the printable features and upscaling the micro parts without loss of geometric fidelity or mechanical strength.

Chemical shield such as an oxygen deadzone culminated by the continuous liquid interface production (CLIP) technology to achieve fast printing [12], yet, is not an effective way of realizing a tight three-dimensional voxel. An emerging advanced technology is to use photo inhibition to generate a photo-induced deadzone with greater thickness (hundreds of µm vs CLIP's tens of µm) to prevent adhesion for viscous resin and facilitate resin reflow for big part AM, and to manipulate the inhibited polymerization for patterning voxel thickness profile [18]. While the primary research interests and outcomes reside in enhancing print speed via thickness control, there is a critical gap in refining the geometric profile especially the lateral profile (including lateral shape, size and resolution) of additively manufactured part in PAM. Existing methods to address the lateral cross-section fidelity of a photopolymerized part mainly rely on formulating resin to be less shrinkable or by modifying projection pattern to compensate the shrinkage [19, 20]. The former imposes heavy constraints to the availability of printable materials and related applications, and the latter depends on modeling accuracy and requires extensive experimental characterization.

Inspired by nanolithography which can produce nanoscale small size circuits and components in semiconductor manufacturing, under the present disclosure it is desirable to provide an unprecedented affordable and multiscale single photon absorption photopolymerization AM (SPP-AM) method and material systems, which can precisely confine both laterally and vertically the photopolymerization process to produce 3D objects with high-fidelity structures (e.g., no edge deficiency, no base expansion, no shape tampering), smaller feature size (<20 µm), higher resolution (<20 µm), and unleashed mechanical properties for high-standard precision applications.

According to the present disclosure, it is desirable to provide a novel PAM process with single photon absorption based photo-inhibition curbed and photo initiated curing (SPA2CurbCure) method, to fabricate complex 3D parts with high-fidelity lateral section profile (no unwanted tapering or tampering), enhanced lateral resolution (<50 µm), reduced lateral feature size (<50 µm), and geometry-independent and tunable mechanical strength. The developed precise PAM process, which addresses all the outstanding issues caused by over cure, under cure, dark cure, trapped cure or residual cure, will improve the process reproducibility and reliability and accelerate a wider adoption photopolymer AM. Such sophisticated applications include but are not limited to printing flexible electronics, fabricating precise high aspect ratio micropillar structures for novel coating, adhesion and actuations, and fabricating microneedle patch and micro-fluidic capillary channels for biomedical application.

Unresolved Residual Curing and Consequences in 3D Photopolymerized Parts

Lateral resolutions in SPP-AM depend on the projected pixel size (e.g., in DLP, typically >50 µm) or beam diameter (e.g., in SLA), the light exposure time and intensity, and resin properties like monomer reactivity, optical absorbance, photochemical efficiency, and radical diffusivity [21]. Existing methodologies to enhance the resolutions usually focus on optimizing exposure conditions [22-24] or resin formulation [19, 21], but can never achieve a real pixel size or beam spot resolution. A more effective approach is envisioned according to the present disclosure to develop a holistic method which consider both the light and resin properties to be able to achieve near-pixel in DLP based SPP-AM or near beam size lateral resolution in SLA like SPP-AM.

According to the present disclosure, "residual curing" is defined as curing of remaining active species such as radicals and monomers trapped in the polymerized part by (1) the transmitted exposure from the subsequent irradiation to create a new layer during the building, (2) the residual exposure dose that could sustain the polymerization process for a while right after the exposure is terminated, and (3) spontaneous environmental radiation after the building process. The three cases are referred, respectively, as "within-build residual curing" (WBRC), "dark residual curing" (DRC) and "post-build residual curing" (PBRC). WBRC can form parts surrounding the previous layers where residual and new active species together facilitate polymerization, altering the shapes and sizes of previously cured parts [19, 25, 26]. DRC, commonly known as "dark curing", can cause over-curing due to the continual curing of abundant leftover active species that could last for certain period after the energy source is shut down, adding complexity to the AM process control [27]. PBRC could degrade the cured part as the residual radicals may readily exist for long term (e.g., months or years) and induce further polymerization which could soften or destabilize the part [28].

In a typical photopolymer AM process, the abovementioned all kinds of residual curing due to the trapped active species have manifested immediately observed overcurings or a long-term gradually degrading of a part, significantly affect the properties (e.g., dimensional accuracy, feature resolution, mechanical strength, stability and potential toxicity) of an as-built part and the corresponding in-service part thereby limiting the wide adoption of photpolymer based AM.

In the conventional vat polymerization AM, lateral size accuracy and resolution are affected severely by succeeding irradiations used for curing subsequent parts. Moreover, as a feature grows vertically, its base tends to expand laterally due to the undesirable curing of residual active species upon new irradiations, defined as "within-process residual curing" (WBRC) in this proposal. Consequently, as shown in FIG. 1, the printed parts or features typically present a tapering shape which may not reflect the true structure such as a cylinder, and the lateral sizes vary vertically with the base being much wider than target. Such issues of lacking shape fidelity and size accuracy are persistent in commercial vat polymerization AM machines, although the feature sizes in the surface layers can be better preserved because the surface parts are lastly cured and least affected by WBRC. The existing vat photopolymerization AM technologies need to be improved to achieve high-resolution and uniformly accurate deposition without WBRC induced errors and without sacrificing mechanical strength and printing speed.

Unfortunately, there is a severe scarcity of research aimed to address the adverse effects of these residual curings, especially due to the status quo of photopolymer AM processes which lack technologies to control the photopolymerization of residual active species. The present disclosure provides an effective technology based on photoinhibition to tackle these residual active species throughout their lifecycle to lead a new-generation of vat polymerization AM technology which can achieve smaller and better-resolved features with desired strength and fabricate parts with overall high-fidelity geometry and no inadvertent tampering of features or parts as is inherent in previous photopolymer based AM processes.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a system for single photon absorption based vat photopolymerization additive manufacturing with photoinhibition induced curb and photoexcitation induced cure (SPA2CurbCure), comprising: a build chamber; a two-wavelength projection irradiation unit delivering a patterned photo-curbing exposure mask and a patterned photo-curing exposure mask, respectively, to create a curing region of initiating chemicals surrounded by a distribution of inhibiting species; wherein a curing light beam comprising light having a first wavelength and a curbing light beam comprising light having a second wavelength from the irradiation unit are manipulated into adjacent complementary exposures, combined by a dichroic beam splitter and collimated into a target resin material in the build chamber.

In another aspect of a preferred system for single photon absorption based vat photopolymerization additive manufacturing with photoinhibition induced curb and photoexcitation induced cure (SPA2CurbCure) of the present disclosure, the irradiation unit aligns coaxially the curing mask of desired cross-section with the mask of surrounding curb, respectively, to deliver a precise and sharp-contrast topological field that is polymerized throughout the target cross-section.

In yet another aspect of a preferred system for single photon absorption based vat photopolymerization additive manufacturing with photoinhibition induced curb and photoexcitation induced cure (SPA2CurbCure) of the present disclosure, exposure parameters such as intensity and duration for the photo-curing and photo-curbing masks, and formulation of the target resin material are set to enable precisely confined photopolymerization for curing 2D high-definition cross-sections to form 3D small features and high-resolution parts.

In a further aspect of a preferred system for single photon absorption based vat photopolymerization additive manufacturing with photoinhibition induced curb and photoexcitation induced cure (SPA2CurbCure) of the present disclosure, diffraction-limited photo-curing of small features of submicron to a few microns is minimized to improve the attainable resolution in PAM.

In another aspect of a preferred system for single photon absorption based vat photopolymerization additive manufacturing with photoinhibition induced curb and photoexcitation induced cure (SPA2CurbCure) of the present disclosure, each of the photo-curing and photo-curbing masks vary in one or more of shape, wavelength, intensity and duration depending on the target's properties such as geometry and mechanics.

Another aspect of a preferred embodiment of the present disclosure comprises a method for single photon absorption based vat photopolymerization additive manufacturing with photoinhibition induced curb and photoexcitation induced cure (SPA2CurbCure), comprising: (a) discretizing a 3D object to be manufactured into a first 2D section; (b) depositing the first 2D section in a build chamber, wherein the first 2D section comprises a curing region of initiating chemicals surrounded by a distribution of inhibiting species; (c) irradiating the first 2D section with a two-wavelength irradiation beam comprising a patterned photo-curbing exposure mask and a patterned photo-curing exposure mask, respectively, to a cure the region of initiating chemicals and inhibit the cure of the inhibiting species in the first 2D section, wherein the two-wavelength irradiation beam comprises a curing light beam comprising light having a first wavelength and a curbing light beam comprising light having a second wavelength which are manipulated into adjacent complementary exposures, combined by a dichroic beam splitter and collimated into the first 2D section in the build chamber; and (d) repeating steps (a)-(c) along with any other steps, as necessary, for additional 2D sections to complete the 3D object.

In another aspect of a preferred method for single photon absorption based vat photopolymerization additive manufacturing with photoinhibition induced curb and photoexcitation induced cure (SPA2CurbCure) of the present disclosure, the curing mask of desired cross-section is coaxially aligned with the mask of surrounding curb in the irradiation beam to deliver a precise and sharp-contrast topological field that is polymerized throughout the 2D section.

In yet another aspect of a preferred method for single photon absorption based vat photopolymerization additive manufacturing with photoinhibition induced curb and photoexcitation induced cure (SPA2CurbCure) of the present disclosure, exposure parameters such as intensity and duration for the photo-curing and photo-curbing masks, and formulation of a resin material for each 2D section are set to enable precisely confined photopolymerization for curing 2D high-definition cross-sections to form 3D small features and high-resolution of the 3D object.

In a further aspect of a preferred method for single photon absorption based vat photopolymerization additive manufacturing with photoinhibition induced curb and photoexcitation induced cure (SPA2CurbCure) of the present disclosure, diffraction-limited photo-curing of small features of submicron to a few microns is minimized to improve the attainable resolution in the 3D object.

In another aspect of a preferred method for single photon absorption based vat photopolymerization additive manufacturing with photoinhibition induced curb and photoexcitation induced cure (SPA2CurbCure) of the present disclosure, each of the photo-curing and photo-curbing masks vary in one or more of shape, wavelength, intensity and duration depending on properties such as geometry and mechanics in the 2D section.

Yet a further aspect of a preferred embodiment of the present disclosure comprises a multi-material vat photopolymerization continuous additive manufacturing (MmVP-CAM) system for simultaneously patterning and or locally functionalizing selected materials in a target into a 3D multi-material object, comprising: a build chamber; a projection irradiation subsystem unit comprising a plurality of light sources, wherein each of the plurality of light sources produces light of a discrete wavelength from the other ones of the plurality of light sources; an individual mask generator for each of the plurality of light sources, such as a Digital Micromirror Device (DMD) or a Spatial Light Modulator (SLM), to shape the light from each light source and to modulate optical properties of such light such as irradiance intensity, phase and polarization; and an optics rig assembly for integrating the plurality of light sources and respective pattern generators, collimating all the patterned light beams to be aligned with the same optical axis before, being delivered to a target in the build chamber.

In another aspect of a preferred multi-material vat photopolymerization continuous additive manufacturing (MmVP-CAM) system of the present disclosure, each of the plurality of light sources comprises a laser.

In yet another aspect of a preferred multi-material vat photopolymerization continuous additive manufacturing (MmVP-CAM) system of the present disclosure, the projection irradiation subsystem unit comprises two light sources.

In a further aspect of a preferred multi-material vat photopolymerization continuous additive manufacturing (MmVP-CAM) system of the present disclosure, the projection irradiation subsystem unit comprises three light sources.

In another aspect of a preferred multi-material vat photopolymerization continuous additive manufacturing (MmVP-CAM) system of the present disclosure, each of the two light sources comprises a laser.

In another aspect of a preferred multi-material vat photopolymerization continuous additive manufacturing (MmVP-CAM) system of the present disclosure, each of the three light sources comprises a laser.

Yet another aspect of a preferred embodiment of the present disclosure comprises a method for multi-material vat photopolymerization continuous additive manufacturing (MmVP-CAM) for simultaneously patterning and or locally functionalizing selected materials in a target into a 3D multi-material object, comprising: (a) discretizing a first multi-material 2D multi-material section of the 3D object; (b) depositing the first multi-material 2D section in a build chamber, wherein the first multi-material 2D multi-material section comprises a plurality of different materials; (c) irradiating the first multi-material 2D section with an irradiation beam comprising a plurality of patterned masks, one patterned mask for each of the plurality of different materials, respectively; wherein the irradiation beam comprises a plurality of different curing light beams, one curing light beam for each of the plurality of different materials, respectively; and wherein the plurality of different curing light beams are integrated with the plurality of patterned masks and collimated to be aligned with the same optical axis before being delivered to the multi-material 2D section in the build chamber.

In another aspect of a preferred system for single photon absorption based vat photopolymerization additive manufacturing with photoinhibition induced curb and photoexcitation induced cure (SPA2CurbCure) of the present disclosure, the build chamber comprises a smart build chamber comprising one or more of the following, one or more microfluidic feeders wherein each microfluidic feeder is controlled by a controller for real-time changing the composition of the photopolymer in each 2D section by adding other substances such as photopolymer initiators and monomers in a timely manner to regulate the reaction rates; a mixer for mixing photopolymer; one or more optical mask delivery devices; a purging and/or suction system (e.g., capillary tube or absorptive sponge) on the surface of the 2D section to remove liquid residual resins in a timely fashion for minimizing residual curing by a transmitted light beam and to reduce deformation induced by gravity and surface drag forces imposed by adsorbed liquid resin.

In yet another aspect of a preferred method for single photon absorption based vat photopolymerization additive manufacturing with photoinhibition induced curb and photoexcitation induced cure (SPA2CurbCure) of the present disclosure, the build chamber comprises a smart build chamber comprising one or more of the following, one or more microfluidic feeders wherein each microfluidic feeder is controlled by a controller for real-time changing the composition of the photopolymer in each 2D section by adding other substances such as photopolymer initiators and monomers in a timely manner to regulate the reaction rates; a mixer for mixing photopolymer; one or more optical mask delivery devices; a purging and/or suction system (e.g., capillary tube or absorptive sponge) on the surface of the 2D section to remove liquid residual resins in a timely fashion for minimizing residual curing by a transmitted light beam and to reduce deformation induced by gravity and surface drag forces imposed by adsorbed liquid resin.

BRIEF DESCRIPTION OF THE DRAWINGS

The present disclosure is illustrated by way of example and not limitation in the figures of the accompanying drawings, in which:

FIG. 1 is an illustration of the disadvantages in traditional single photon absorption polymerization additive manufacturing;

FIG. 2 Is an illustration of outlier reactive species (ORS) in conventional photopolymerization additive manufacturing with single curing exposure mask or single curing laser beam;

DETAILED DESCRIPTION OF PREFERRED EMBODIMENTS

The following description, taken in conjunction with the referenced drawings, is presented to enable one of ordinary skill in the art to make and use the disclosure and to incorporate it in the context of particular applications. Various modifications, as well as a variety of uses in different applications, will be readily apparent to those skilled in the art, and the general principles, defined herein, may be applied to a wide range of aspects. The present disclosure is not intended to be limited to the aspects disclosed herein. Instead, it is to be afforded the widest scope consistent with the disclosed aspects.

Concept and Method of SPA2CurbCure of the Present Disclosure/Outlier Reactive Species In photopolymerization, photo induced reactive species (RS) could be free radicals, cationics or anionics, which can crosslink monomers and or oligomers into final solid polymer. All these reactive species outside the target to-be-cured zone are called as outlier reactive species (ORS) as illustrated in the FIG. 2. There are several channels which lead to the existence of ORS in regular PAM with single curing laser beam or single curing projection exposure.

1. Scattered light at the boundaries could be absorbed by photo initiators to generate RS just around the boundaries.

2. The stimulated photo initiators which are at intermediate states such as singlets and triplets could diffuse outside the boundaries and end up forming RS outside.

3. The RS generated inside the target curing area diffuse outside the boundaries.

Photo-Curbing Based on Photo Inhibition Mechanisms

Figure 3:
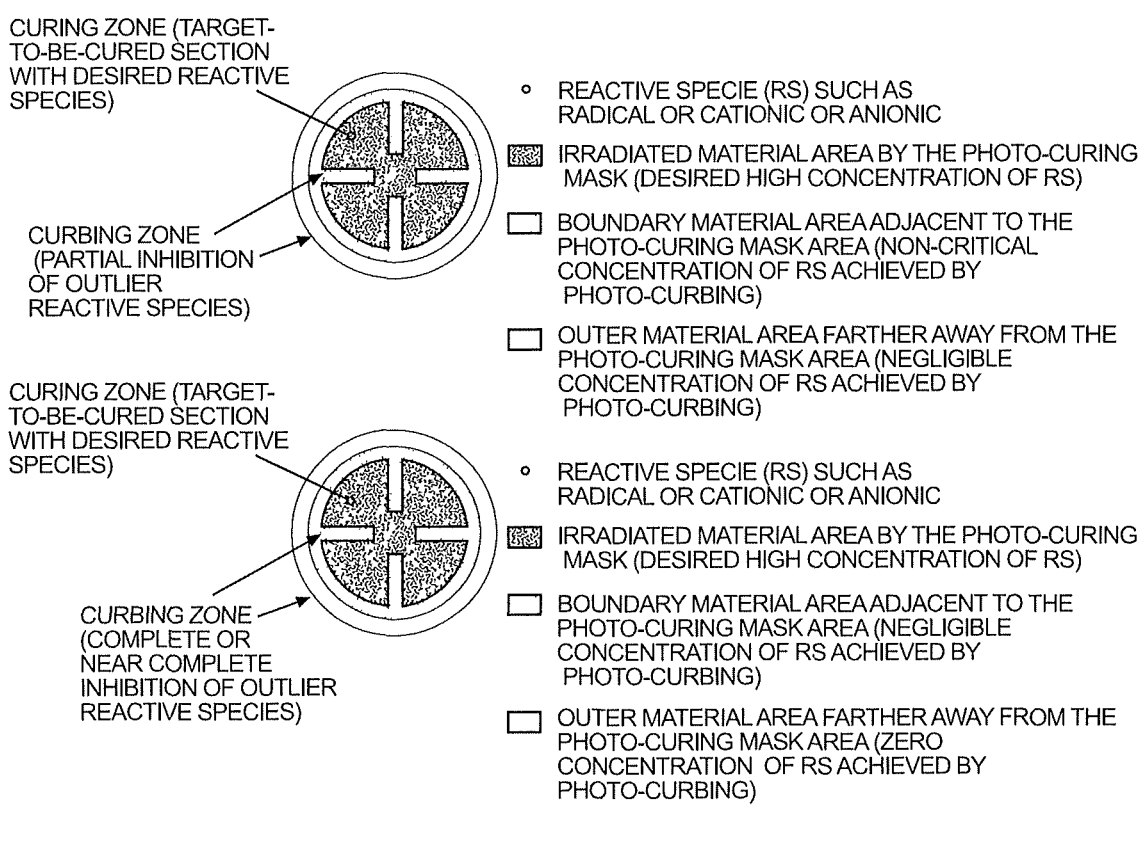
FIG. 3 shows an example of "photo-curbing" or Single Photon Absorption Polymerization Additive Manufacturing with Photoinhibition induced Curb and Photoexcitation induced Cure (SPA2CurbCure) of the present disclosure.

The ORS is a significant cause of over curing and other unwanted residual curing, accounting in a large prat for the dimensional errors and loss of resolution. Photo inhibition induced by the photo-curbing exposure could produce a "curbing zone", which means a region of reduced ORS outside the curing zone (FIG. 3).

Different photo-inhibition mechanisms could be used to confine the photopolymerization. One embodiment mechanism is referred as "photo-abortion" which uses photo-depletion of the intermediate states to abort the generation of radicals. This mechanism can effectively inhibit all the channels of ORS except for the third one. Another embodiment mechanism is referred as "photo-counteraction" which uses photo inhibitors to terminate the crosslinking process where RS are already generated. A third embodiment mechanism is "photo-oxygen" such as photosynthesis which could generate oxygen or other oxygen-like species under photo exposure area to inhibit polymerization process in that certain area. The mechanisms of "photo-counteraction" and "photo-oxygen" can inhibit all the ORS channels. Various elaborated methods on fulfilling the principles of "photo-abortion", or "photo-counteraction", or "photo-oxygen", or methods of different combinations of the mechanisms can be used as an effective photo-inhibition mechanism to confine the photopolymerization in the SPA2CurbCure.

SPA2CurbCure Method

According to a preferred SPA2CurbCure process of the present disclosure, one primary use of photo inhibition is to perform "photo-curbing" which adopts an inhibiting exposure beam that is complementarily shaped and circumferentially adjacent to the curing area and is aimed to enhance the feature size, resolution and geometric profile.

Figure 4:
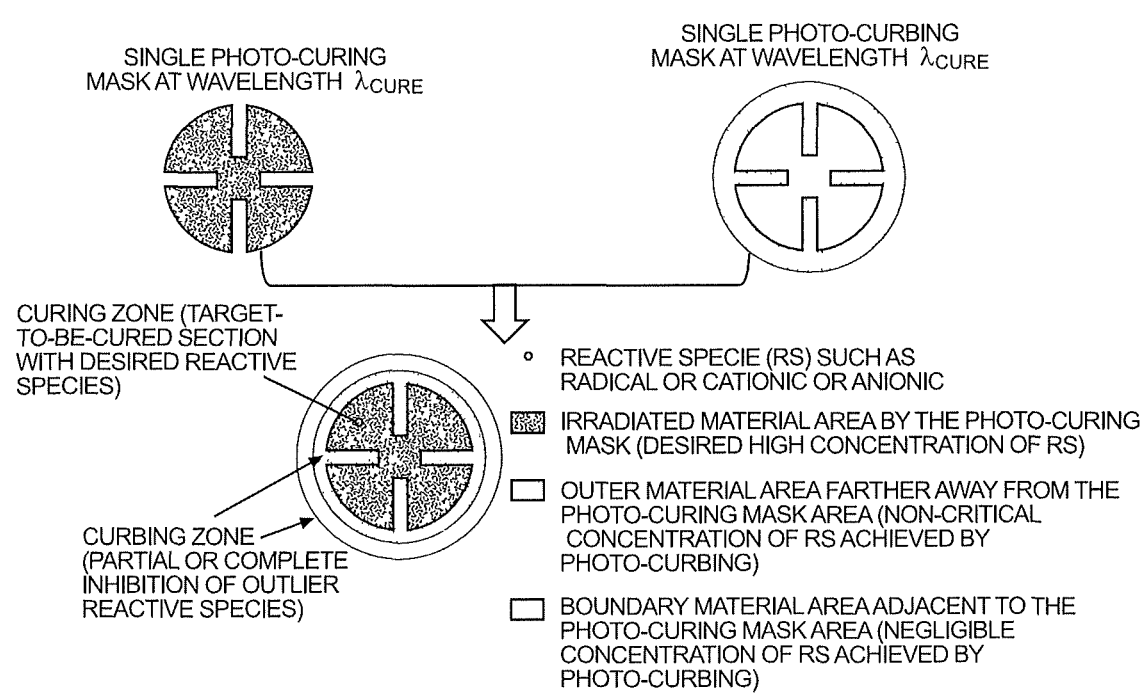
FIG. 4 shows an example of "photo curb cure" or Single Photon Absorption Polymerization Additive Manufacturing with Photoinhibition induced Curb and Photoexcitation induced Cure (SPA2CurbCure) of the present disclosure.

As illustrated in FIG. 4, by combining a photo initiation exposure and a photo inhibition exposure, a photo curbed curing zone is defined and polymerized into part of a target 3D object. In principle, over-curing a part can be prevented by a partial inhibition just to bring the concentration of RS down below the threshold, all the above mentioned mechanisms of "photo-abortion", "photo-counteraction" and "photo-oxygen" can be successfully applied to confine spatially the 3D photopolymerization. Other photo-induced mechanisms preferably can also be used for photocuring in an embodiment design of SPA2CurbCure. In this case of SPA2CurbCure, it focuses on lateral dimension accuracy and lateral resolution. Note that the photo-curbing mask shape can be arbitrary as long as it contains the target photo-curing area.

Theoretically, the solid part contained in a lateral cross-section can be generated by a photo exposure which generates initiators to crosslink monomers in the projected area, while the adjacent areas outside the boundaries of the cross-section can be protected by a separate photo exposure which generates inhibitors to suppress or curb the polymerization at transition zones surrounding the cross-section. The photo-inhibition prevents unwanted solidification, for instance, the partial curing that occurs outside and nearby the boundaries, to enhance the cross-sectional profile with little or no blurring on the boundaries. Furthermore, with the inhibition exposure beam finely confines the boundaries of the polymerized cross-section, the usually under cured edges (or "edge effect) commonly observed in traditional PAM due to a reduced intensity at the edge of a Gaussian irradiance profile and due to the diffusion of active species can be treated by applying adequate localized curing exposure dose without concerning about over-curing as is the issue in conventional practice. As a result, the effective curing area can be more clearly defined and maintained by the spatial union of the two beams (i.e., photo curing beam and photo curbing beam) and dynamically varying the intensity ratio and shapes as necessary. Photo-curbing can realize feature sizes and lateral spatial resolutions at pixel size scale which are unattainable in current PAM technologies.

The exposure parameters of both the photo curing and photo curbing beams including wavelength, intensity, pattern and timing are important to obtain a well-defined cross-section [29, 30]. Another important factor to accomplish a successful photo-curbed photopolymerization resides in the formulation of photo resin for the PAM process [31]. The material design for SPA2CurbCure depends on the mechanisms of photo inhibition, or conversely, a proper photo inhibition mechanism could be chosen for certain type of material of interest.

Designing the SPA2CurbCure System and Process

The challenges associated with the machine design stem from two parts—optics design and mechanical design. The proposed photo inhibited polymerization requires a flexible and versatile light engine that can deliver multiple optical masks with individual wavelengths. Each optical mask presents a spatial distribution of light intensity and phase. There is no off-the-shelf light engine that could meet the requirements, presenting challenges in the optics design. According to the present disclosure, it is desirable to provide a novel light engine that functions as a beam crafter to modulate spatially the light field's key parameters including wavelength, intensity, phase and polarization, outputting a set of customized optical masks that possess synergic roles of a programmable wavelength filter (dubbed as "wave-length-mask" or "$\lambda$-mask"), an intensity mask or "I-mask", and a phase mask or "$\varphi$-mask". The optical masks are functionally divided into photo curing exposure mask and photo curbing exposure mask. A curing mask or a curbing mask can perform multiple roles as an integrated wave-length-intensity-phase-mask ($\lambda$-I-$\varphi$-mask) with each parameter being able to dynamically adjustable to adaptively control the polymerization process dynamics to define the cured geometric features more accurately and precisely.

Also according to the present disclosure, it is desirable to provide a mechanical design which primarily aims to build a smart build platform that could accommodate the in-situ microfluidic feeders to refill the material in time to ensure the concentration of photo functional species (e.g., inhibitors) which are critical in the performance of photo curbing.

Another novel design for a photopolymer AM process and machine according to the present disclosure, is to add a purging or suction system (e.g., capillary tube or absorptive sponge) on the resin surface to remove the liquid residual resins in a timely fashion. This layer-wise cleansing process provides two benefits: (1) help remove the possibility of residual curing by the transmitted light beam; (2) reduce the deformation induced by the gravity and surface drag forces imposed by the adsorbed liquid resin.

Schematics of System Layout

Figure 5:
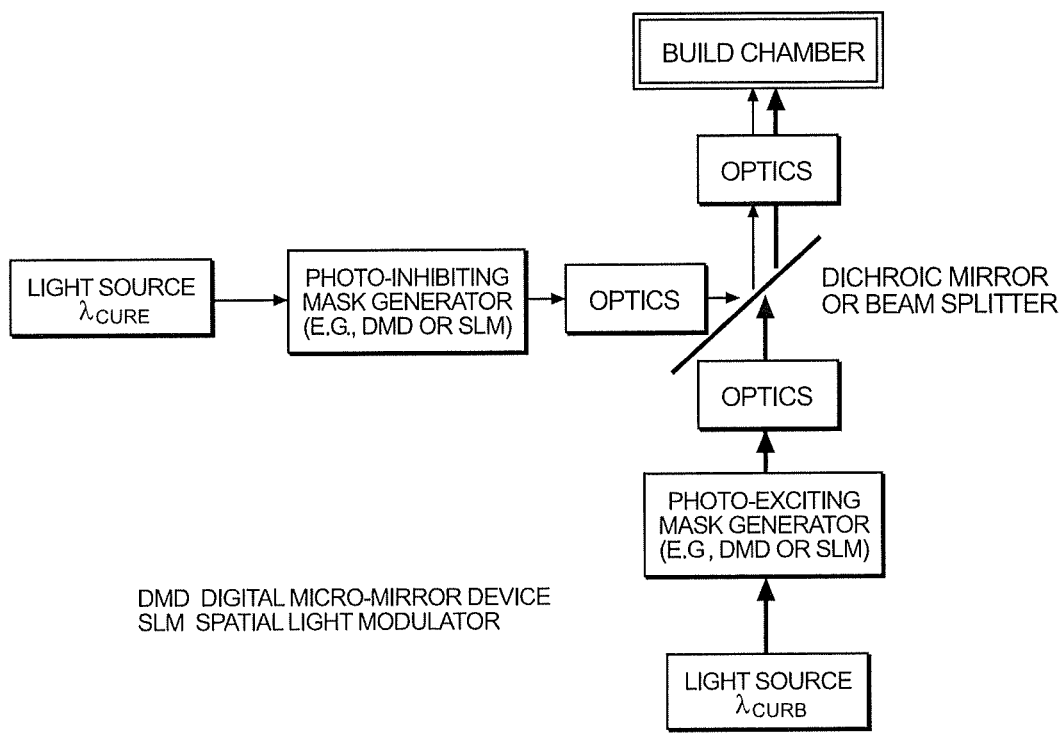
FIG. 5 shows an example of the present disclosure for Single Photon Absorption Polymerization Additive Manufacturing with Photo-inhibition induced Curb and Photoexcitation induced Cure (SPA2CurbCure)—a Two-Wavelength Projection System for Photo-curing and Photo-curbing respectively to enable precisely confined photopolymerization for curing 2D high-definition cross-sections to build 3D small features and high-resolution parts.

According to the present disclosure, it is desirable to provide an optical system to enable the envisioned photo-curbed photo-curing method for precise vat polymerization AM. The layout of a SPA2CurbCure system is demonstrated in FIG. 5, with a two-wavelength projection irradiation delivering a patterned photo-curbing exposure mask and a photo-curing exposure mask, respectively, to create a curing region of initiating chemicals surrounded by a distribution of inhibiting species. The curing and curbing light beams are manipulated into adjacent complementary exposures, combined by a dichroic beam splitter and collimated into the resin material. The optics are carefully designed to align coaxially the mask of desired cross-section with the mask of surrounding curb, respectively, to deliver a precise and sharp-contrast topological field that is polymerized throughout the target cross-section. Optimizing the exposure parameters such as intensity and duration for the photo-curing and photo-curbing masks, and developing a proper formulation of materials, can enable precisely confined photopolymerization for curing 2D high-definition cross-sections to form 3D small features and high-resolution parts. Furthermore, a preferred method according to the present disclosure can potentially circumvent the diffraction-limited photo-curing of small features (e.g., submicron to a few microns) to improve the attainable resolution in PAM. The multi-wavelength masks could vary in shapes, wavelengths, intensities and duration depending on the target part's properties such as geometry and mechanics. The size and shapes of the fabricated parts are not limited by the example. An embodiment design of a SPA2CurbCure system could have various choices and assembly arrangements of the components including the light source, optics and building chamber.

Design of Build Chamber

Another part of the SPA2CurbCure system and method of the present disclosure is preferably a smart build platform that could accommodate the microfluidic feeders and deliver the optical masks neatly.

Preferably, the online feeder is designed to allow changing the composition of the photopolymer by adding other substances such as photopolymer initiators and monomers in a timely manner to regulate the reaction rates. A system that could immediately mix photopolymer in the vat is preferred.

A novel design of the SPA2CurbCure system and method of the present disclosure is to add a purging or suction system (e.g., capillary tube or absorptive sponge) on the resin surface to remove the liquid residual resins in a timely fashion. This layer-wise cleansing process provides two benefits: (1) help remove the possibility of residual curing by the transmitted light beam; (2) reduce the deformation induced by the gravity and surface drag forces imposed by the adsorbed liquid resin.

Embodiment Design of Process Workflow #1: A Basic Process Flow Chart of SPA2CurbCure for Printing High-Fidelity High-Resolution 3D Objects.

Figure 6:
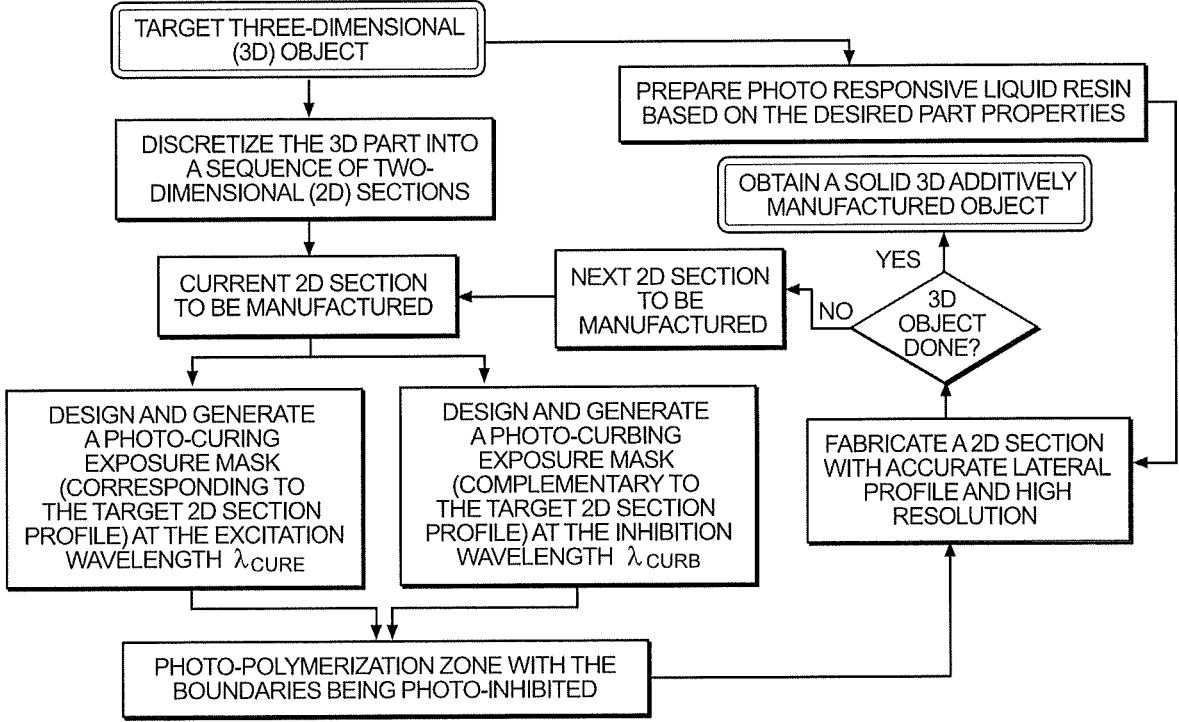
FIG. 6 shows an example of the present disclosure for Single Photon Absorption Polymerization Additive Manufacturing with Photoinhibition induced Curb and Photoexcitation induced Cure (SPA2CurbCure)—a basic process flow chart of printing high-fidelity high-resolution 3D objects.

FIG. 6 presents a basic process flow chart of SPA2CurbCure for printing high-fidelity high-resolution 3D objects according to the present disclosure.

In a photo-curbing exposure mask or a photo-curbing exposure mask of the present disclosure, preferably all the light properties such as wavelength, intensity, polarization and phases can be locally mediated. These light properties in a photo-exposure mask or a photo-curbing mask can be dynamically addressable and changeable The light beams shaped by a photo-curing exposure mask and a photo-curbing exposure mask, respectively, preferably can be delivered to the material from any direction, for instance, from beneath the material substrate, from the side of the build chamber, or from the top of the material vat.

The basic scheme of delivering a photo-curing exposure mask and a photo-curbing exposure mask is to shine them simultaneously. However, the timing of the curing exposure and the curbing exposure can vary, for example, the two exposures can be synchronized, or the curbing exposure can start shining ahead of or after the curing exposure. Also, the duration of the curing exposure and the duration of the curbing exposure are independent, and each could be longer or shorter than the other. For instance, in some preferred embodiments with certain materials, the curbing exposure could last longer during the printing process than the curing exposure to obtain a good inhibition efficiency.

In some other embodiments, multiple photo-curing exposure masks and or multiple photo-curbing exposure masks with different wavelengths and or different projections can be used to fabricate an object.

In yet additional embodiments of the present disclosure, an in-situ monitoring and or measurement system can be provided and added onto the SPA2CurbCure system. A closed-loop or real-time control system can be developed with the measurement feedback as shown in FIG. 7.

According to the present disclosure, a photo-polymerization zone is confined by photo-inhibition, and the section boundaries including both vertical and lateral boundaries. The SPA2CurbCure of the present disclosure uses the lateral boundary inhibited photopolymerization to fabricate 3D objects with accurate sections featuring geometric fidelity, dimensional accuracy, high resolution and minimal overcuring.

Figures 7, 8:
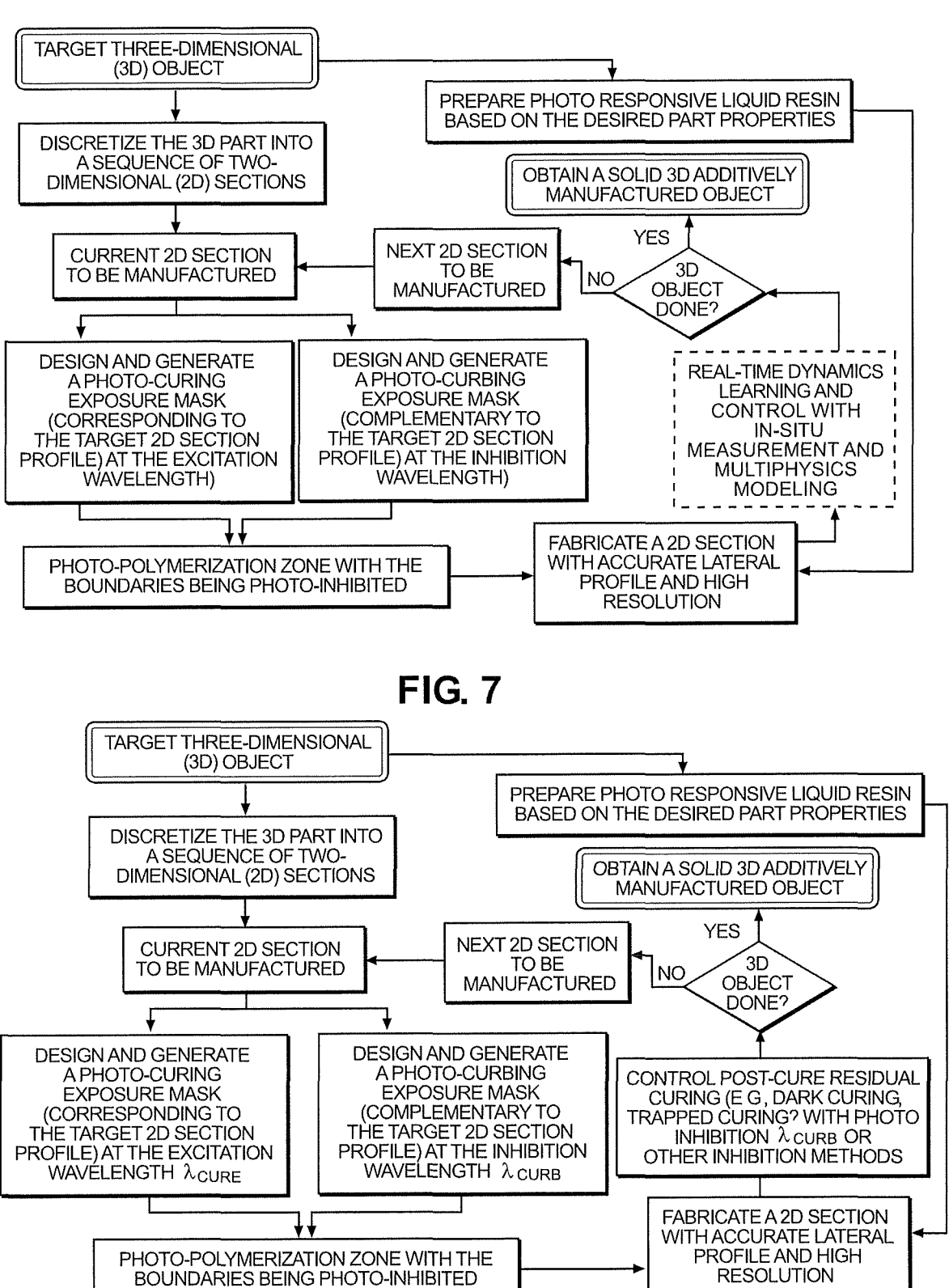
FIG. 7 shows an example of the present disclosure for Single Photon Absorption Polymerization Additive Manufacturing with Photoinhibition induced Curb and Photoexcitation induced Cure (SPA2CurbCure)—a basic process flow chart of printing high-fidelity high-resolution 3D objects with Real-time Process Dynamics Learning and Control.
FIG. 8 shows a basic process flow chart that describes steps for the SPA2CurbCure method to incorporate photoinhibition based scavenge of residual reactive species of the present disclosure.

Embodiment Design of Process Workflow #2; an SPA2CurbCure Method and System with a Novel Online Photo-Inhibition Based Scavenge of Residual Reactive Specie in Photocured Part FIG. 8 demonstrates another embodiment design and use of the proposed SPA2CurbCure method of the present disclosure to control dark curing to provide additional accuracy in the process. The layer-by-layer photo-scavenge with the inhibition exposure can also mitigate the negative effects of radicals trapped in the crosslinked polymers during regular photopolymerization [28, 32]. Radicals remained in the polymer part readily exist for months to years, therefore, the residual radicals are potentially toxic and could induce further polymerization that could change the cured part properties (e.g., dimensions, density and modulus).

Figure 9:
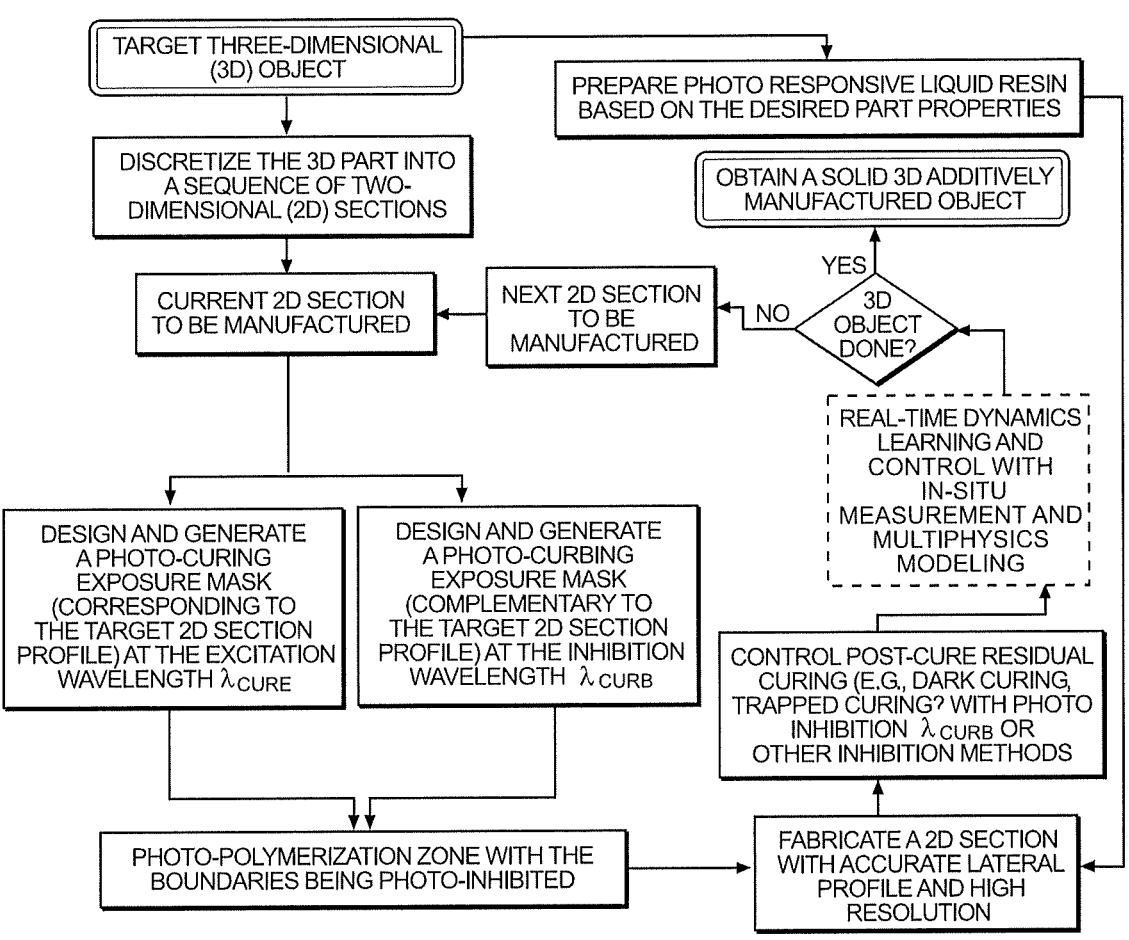
FIG. 9 is a real-time learned and controlled process flow chart that describes steps for the SPA2CurbCure method of the present disclosure to incorporate photo-inhibition based scavenge of residual reactive species.

FIG. 9 includes a real-time process dynamics learning and control module to enhance the process accuracy, robustness and repeatability in an SPA2CurbCure system of the present disclosure with photo-scavenge design.

Example: Use SPA2CurbCure to Fabricate a Micro-Pillar Array Structure

Artificial hair or micro-pillar structures can present fine texture or novel coating on a surface, and can also be developed into sophisticated sensors and actuators [33]. Material science and mechanical engineers have long been investigating various methods of fabricating hair-like structure. For example, due to the limitations of the available microfabrication methods, micropillar electrode arrays which are essential tools in recording multiplex biophysiological signals in neural and cardiac research, are by default made by inorganic hard materials. Recent research shows that soft conductive hydrogel based micropillar electrode arrays outperforms state-of-the-art hard electrodes in being able to enhance the signal amplitude and signal-to-noise ratio due to their tissue-like elastic modulus [34]. However, one biggest hurdle in producing such high-performance 3D soft micropillar electrode arrays for acquiring strong electrophysiological signals, is the lack of a capable fabrication method to produce such structures with exact shape and accurate dimensions.

Figure 10:
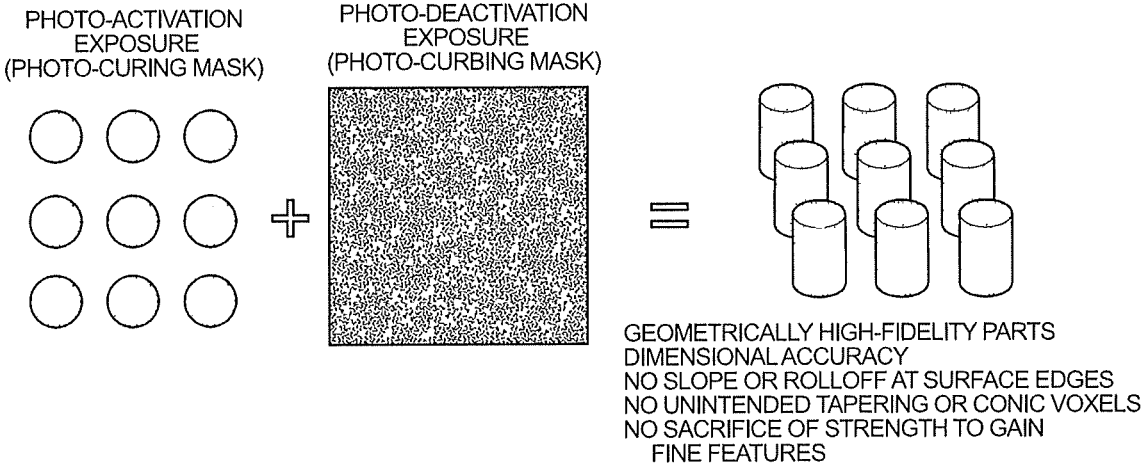
FIG. 10 is an illustrative example of photo-curing and photo-curbing masks of the present disclosure for fabricating cylindrical specimens in example application (e.g., micro-pillar-array)
Figures 11, 12:
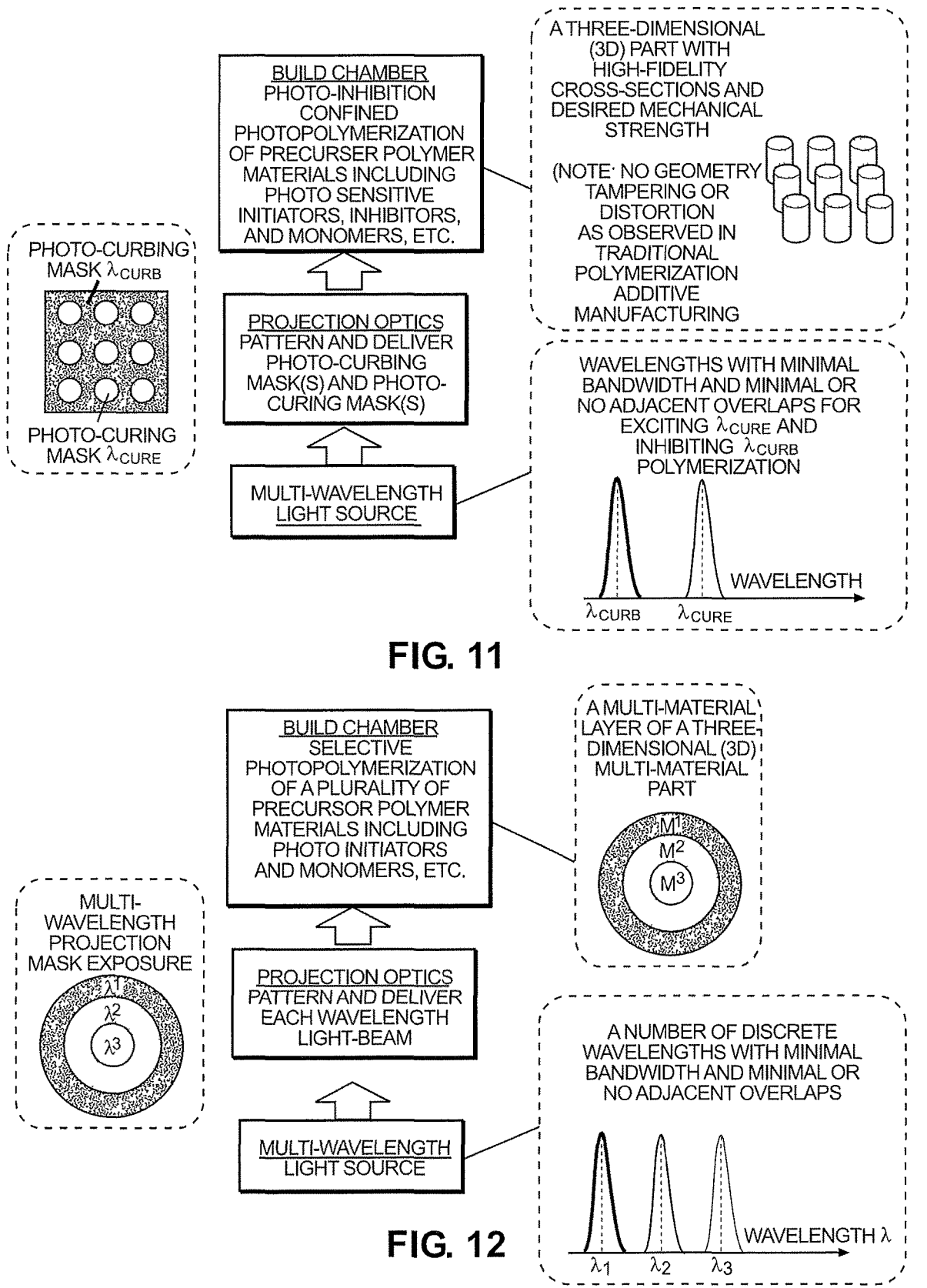
FIG. 11 is a schematic of one embodiment of SPA2CurbCure System of the present disclosure for fabricating cylindrical specimens in example application (e.g., micro-pillar-array)
FIG. 12 shows an example of the present disclosure for Multi-material Vat Photopolymerization Continuous Additive Manufacturing (MmVP-CAM)—an example schematic of an MmVP-CAM based on multi-wavelength selective photopolymerization.

The proposed SPA2CurbCure method of the present disclosure, as illustrated in FIG. 10 and FIG. 11, is able to preserve the lateral shape accuracy during the entire fabrication process, enabling the realization of challenging structures such as the mentioned micro-pillar arrays.

Conventional SPP-AM technologies typically use single scanning or single projection of light beam to cure each layer of a 3D part, suffering limited resolutions, inadequate feature size (>100 μm) and dimensional errors (tens of μm). Moreover, the current PAM cannot fabricate vertical features or vertical parts with desired uniform cross-sections such as cylinders and usually ends up with a tapering part instead. Such an inability restricts the adoption of PAM for applications which demand high fidelity in geometric shapes and sizes. According to the present disclosure, it is desirable to employ photo inhibition to suppress the unwanted curing and to reinforce the boundaries of the curing zone and thus the cured part, and is expected to deliver a disruptive SPP-AM technology that can offer a breakthrough in feature size and resolution (<50 μm), and dimension accuracy (error at several μm) without sacrificing mechanical strength or printing speed or resorting to the expensive, complex and low throughput two-photon polymerization.

Specifically, from the perspective of digital light processing (DLP) PAM, the SPA2CurbCure method of the present disclosure can enhance the part resolutions and small features, solving the paradox between projection pixel size and the lateral cured width and resolution. The SPA2CurbCure method of the present disclosure can achieve fine polymerized feature sizes (i.e., <50 μm) that are smaller than currently attainable constantly along the vertical axis without inadvertently enlarging the base. The SPA2CurbCure method of the present disclosure can also achieve lateral resolution of the same order of magnitude as the pixel size (range: 10~50 μm) consistently through the printed part from the base to the top. Another benefit of the SPA2CurbCure method of the present disclosure is that it eliminates the need for low-intensity curing to fabricate small features. The SPA2CurbCure method of the present disclosure can fabricate parts with small sizes, mechanical strength and printing speed, which are commonly unattainable at the same time.

Other than addressing the intractable WBRC issues, the SPA2CurbCure method of the present disclosure tackles another unwanted residual curing—dark curing, which contributes to dimensional inaccuracies. The SPA2CurbCure method of the present disclosure also addresses the post-build residual curing (PBRC) of long-term trapped active species by proactively "cleaning" the trapped residuals using photoinhibition on a layer by layer basis in a timely manner to mitigate or even eliminate the residuals so as to overcome the potential health hazard among other adverse effects such as structure instability or degradation (e.g., softening). Furthermore, photoinhibition is for the first time utilized as an online cleaning process to reduce or even remove the trapped leftover species layer by layer for vat polymerization AM. The efficiency of photo-cleaning based on photoinhibition according to the present disclosure opens up a novel thinking and a new approach for addressing the disturbing residual hazards which have limited the applications of vat polymerization AM in biomedical and other high-standard applications.

As a summary, the SPA2CurbCure method of the present disclosure offers unique advantages in being able to (1) address the unwanted WBRC and DRC to improve the lateral dimension accuracy, reduce smallest feature size, increase lateral resolution and regulate the cross-section shape from being tampered or tapered, (2) increase the degree of curing thus mechanical strength without sacrificing dimensional accuracy, and (3) mitigate or even eradicate PBRC of "trapped photocurable species" to enhance the stability of the printed material and structure and reduce the potential residual hazard such as toxicity. The strategic approach of exploiting photoinhibition to regulate voxel curing and to clean residual active species by suppressing the residual curings could establish an effective control of the unwanted photopolymerization process, revolutionize PAM technologies to be more precise and less risky in real-life adoptions.

The developed SPA2CurbCure method and system of the present disclosure establish a comprehensive photo-inhibition scheme to regulate PAM with an emphasis on lateral profile refinement. As an extension, it can be readily combined with inhibition-based thickness control (e.g., oxygen inhibition or photo inhibition) to produce 3D parts with overall precision and accuracy in both lateral and vertical dimensions and resolutions that are impossible in conventional PAM. The SPA2CurbCure method of the present disclosure uses double mask high definition confined curing and can lead the general PAM as a maximally precise and minimally compromised technology with virtues of low-cost, operational ease, high speed, production capability, sub-50 μm resolution and several-micron error, providing an ideal AM process for multi-scale fabrication of large-format small-feature parts.

According to the present disclosure, it is desirable to provide an SPA2CurbCure method to benefit a broad range of high-profile applications include fabricating meta materials, micro-pillar structures for novel surface texture [33] and adaptive coating, highly resolved scaffolds for tissue-engineering, microelectronics for solar cells and flexible electronics, soft robots, micro-optics for high-density data storage [35], and micro-fluidics for biochemical analysis. System and Method for Three-Dimensional (3D) Multi-Material Vat Photopolymerization Continuous Additive Manufacturing (Mm VP-CAM) Based on Multi-Wavelength Selective Photon Excitation and Aided by Real-Time Process Dynamics Learning and Control A variety of industries would greatly benefit from a multi-material additive manufacturing (MmAM) technique that is capable of printing real-world applicable parts and functional devices composed of multiple materials. Such applications range from biological tissues, to architecture materials, electronics, sensors, actuators, and soft robots. Vat photopolymerization additive manufacturing (VPAM) technologies, such as Stereolithography (SLA) and Digital Light Processing (DLP), are adopted in industries for three-dimensional (3D) parts production due to the distinct advantages of photopolymerization—high spatiotemporal precision, high production late and room temperature environment. However, existing vat photopolymerization multi-material AM (VPMmAM) is based on either materials embedding or materials switchover, and limited in one-dimensional (1D) MmAM. Because of mechanical and optical configuration constraints, materials can only be printed layer by layer instead of integrating multiple materials within one layer. This limits the space available for varying materials and the designs of multi-material components, and tend to cause delamination due to lack of intra-layer bonding. In addition, existing VPMmAM is limited in printing speed, dimensional accuracy and mechanical strength due to the frequent process interruptions necessitated by the materials changeover mechanism. The printable materials also must be chemically similar due to the single-wavelength absorption and the otherwise lack of fusion between dissimilar materials. According to the present disclosure, it is desirable to overcome these issues and provide a novel VPMmAM method that can vary materials both across a layer and throughout layers to fabricate truly 3D multi-material components with improved geometric accuracy, enhanced speed, improved mechanical strength, and expanded materials selection.

According to the present disclosure, it is desirable to provide a novel multi-material vat photopolymerization continuous additive manufacturing (MmVP-CAM) method that uses multi-wavelength light sources to simultaneously pattern and or locally functionalize selected materials into a 3D multi-material object with enhanced interface properties (e.g., higher bonding strength, reduced stress and distortion) at increased fabrication speed. The unique optical system with multi-wavelength light sources can multiply the variety of materials applicable in VPMmAM and can form a critical wavelength mask to enable the continuous and simultaneous photocuring of multiple materials to form a 3D component. According to the present disclosure, it is desirable to: (1) provide an MmVP-CAM method based on multi-wavelength selective photocuring with novel optics configuration and optimal materials design; (2) characterize the new process dynamics by in-situ monitoring and multiphysics modeling; (3) evaluate the multi-material interface properties by mechanics analysis and testing; (4) provide a validated method of fabricating sophisticated objects.

According to the present disclosure, it is desirable to provide a feasible and capable method for 3D multi-material fabrication with a novel continuous process in which a mixture of multiple precursor photo resins can be cured simultaneously and selectively. According to the present disclosure, it is desirable to provide process dynamics of multi-wavelength curing and the resultant part properties. According to the present disclosure, it is desirable to utilize selective photon initiation, spatially diversified simultaneous polymerizations, multiple materials interaction, heterogeneous microstructure forming in preferred VPAM processes. Integration of the newly developed MmVP-CAM method with existing processes will offer a more powerful hybrid AM process. The MmVP-CAM method of the present disclosure will help establish a paradigm to transform polymer science and engineering into advanced materials and manufacturing capabilities.

The MmVP-CAM method of the present disclosure will advance the applications of multi-material AM to develop metamaterials and functional graded materials, fabricate sensors and electronics, 4D print actuators and soft robots, and bioprint physiological tissues and organs.

Introduction and Motivation

Additive manufacturing (AM) or 3D printing is a capable technology of transforming digital designs into physical objects with complex geometries and or unconventional material systems. Multi-material AM (MmAM) has been identified as a key enabling technology to increase the acceptance of AM for more practical applications such as bioprinting and medicine which by nature usually involves with multiple materials [36]. One basic approach of MmAM is adding special materials such as composite fibers and graphene to enhance the desired mechanical or electrical properties of additively manufactured parts. This MmAM method of embedding reinforcing materials to a base material is unable to separate spatially the materials to form different material zones. Alternatively, almost all kinds of AM processes have been modified to fabricate multi-materials parts, and those demonstrated MmAM share a common fundamental approach of switching materials [37]. For instance, powder bed MmAM changes powders during the build, and vat photopolymerization MmAM transfers the build part to different vats. Such MmAM techniques are slow in materials switchover and prone to contamination issues and cannot easily achieve multi-material fabrication within each layer (3D multi-material) but between layers (1D multi-material). Nozzle jetting MmAM can rapidly alternate materials and flexibly deposit materials on demand at each point or area but is limited in printing speed due to the point-based building process and the narrow working range of an ink jet actuator or even a nozzle array [38]. According to the present disclosure, it is desirable to provide an improved and versatile MmVP-CAM.

Vat photopolymerization AM (VPAM) solidifies light-absorptive liquid resin into a 3D part and has evident advantages in fabrication flexibility, printing speed, geometric accuracy and surface finish [39]. The lithography-based AM approaches such as stereolithography (SLA), digital light processing (DLP), and continuous liquid interface production (CLIP) and holographic AM belong to this class of VPAM [40-43]. It has been widely used in rapid prototyping and tooling and is advancing into diverse sophisticated applications in light-weight products, flexible electronics and biomedical engineering. Correspondingly, vat photopolymerization based multi-material AM (VPMmAM) is desired to fabricate 3D complex structured functional parts. The status quo of VPMmAM is confronting issues similar to these in the abovementioned MmAM processes. Specifically, commonly available method of VPMmAM transfers the build part to different vats by a materials changeover mechanism to feed different types of photopolymerizable resins and cure one material zone at one time [44-46]. This material switchover based multi-material AM is seriously inefficient with long build time due to the materials changeover and cleaning. Worse still, the existing methods are limited in materials bonding strength, geometry accuracy and resolution due to the disadvantages of a discontinuous manufacturing process caused by the materials switching process. Moreover, the base materials used in current VPMmAM are generally constrained to one similar type of photopolymers which must react to the same single wavelength light source provided by the available MmAM systems.

According to the present disclosure, it is desirable to provide a novel multi-material vat photopolymerization continuous additive manufacturing method (MmVP-CAM) that can simultaneously cure multiple types of photopolymer materials to continuously and rapidly create 3D multi-material objects with improved dimensional accuracy and enhanced interface properties (e.g., higher bonding strength, reduced stress and distortion). The MmVP-CAM method of the present disclosure eliminates the mechanical process of changing materials and thereby reduces significantly the build time. The MmVP-CAM method of the present disclosure can smoothen and strengthen the materials bonding and enhance the multi-material part properties such as seamless transition, surface finish, geometry fidelity and mechanical strength. Furthermore, the adoption of multiple wavelength light sources can expand the material choices and design spaces for fabricating unique components with different types of photopolymers or functional groups of materials that cannot be assembled by conventional processes which use a single wavelength light to cure liquid resin with similar absorptions only. According to the present disclosure, it is desirable to upgrade another kind of VPAM process based on two photon polymerization (TPP) which is highly precise and capable of nanoscale fabrication but not able to handle multiple materials printing due to its optical configuration constraints [47, 48].

Mm VP-CAM Method and System

The overall method of MmVP-CAM of the present disclosure is based on wavelength selective polymer network formation in macromolecular chemistry [49, 50]. The core of the MmVP-CAM method of the present disclosure is to selectively cure certain area with exclusively single wavelength and exclusively different material to form differentiated material zones into 3D multi-material parts. Under each wavelength exposure, only a unique set of compositions is allowed to be cured to precisely control the compositions of resulted 3D multi-material parts.

The schematic of an MmVP-CAM method (FIG. 12) is for illustration purpose only. It is not to limit the number of wavelengths to be used, not to limit the exact value of each wavelength, not to limit the sizes, positions and shapes of the exposure masks, not to limit the materials choices and locations, not to limit the size and shapes of the fabricated part, and not to limit the spatial arrangement and embodiment design of the 3D Printing system of the present disclosure. The projection wavelength mask could be delivered to the build chamber from under, from above, from the side or from different angles. Instead of a projection mask, a multi-wavelength light beam scanning system can be used in an embodiment of MmVP-CAM of the present disclosure to fabricate multi-material parts.

Design of Light Engine

To obtain high selectivity in the multiple curing process, the proposed MmVP-CAM system of the present disclosure requires a flexible and versatile light engine that can deliver multiple optical masks with individual wavelengths and narrow bandwidth. Each optical mask presents a spatial distribution of light intensity and phase. There is no off-the-shelf light engine that could meet the requirements for implementing the MmVP-CAM method of the present disclosure, presenting challenges in the optics design. Two preferred embodiment designs of the optical wavelength mask of the present disclosure are set forth herein below. Additionally, according to the present disclosure, future advanced techniques such as tunable wavelength filters may offer alternative systems or methods for developing a wavelength mask to regulate the selective localized polymerization process for the MmVP-CAM of the present disclosure.

Alternating Wavelength Masks

The envisioned wavelength selective mask, however, is not commercially available, and there is no mature light engine capable of simultaneously programming wavelength at different pattern areas. An alternative way of "quasi-simultaneous" multi-wavelength irradiation according to the present disclosure is to exploit the relatively "long" exposure time of photocuring against the high-speed nature of digital light processing. One can turn on one laser source at a time and expose the corresponding area of interest, and then switch to another laser source and pattern for another area of interest with a different material. All wavelength mask switching can be done in less than a millisecond—much faster than the resin can cure.

Aligning Wavelength Masks

A preferred embodiment of a MmVP-CAM system of the present disclosure is shown below, stacking multiple collimated and coaxial wavelength masks. A simultaneous multi-wavelength irradiation rather than the approach of alternative switching wavelengths is preferably employed. A compact multi-wavelength light engine preferably includes the following key components:

1. Multiple individual laser source with sufficiently spaced discrete wavelengths.
2. Individual mask generators such as Digital Micromirror Device (DMD) and Spatial Light Modulator (SLM) to shape each laser beam and to modulate optical properties such as irradiance intensity, phase and polarization.
3. Optics assembly that can integrate the multiple lasers and pattern generators, collimating all the patterned laser beams which are aligned with the same optical axis before being delivered to the resin chamber.

Figures 13, 14, 15:
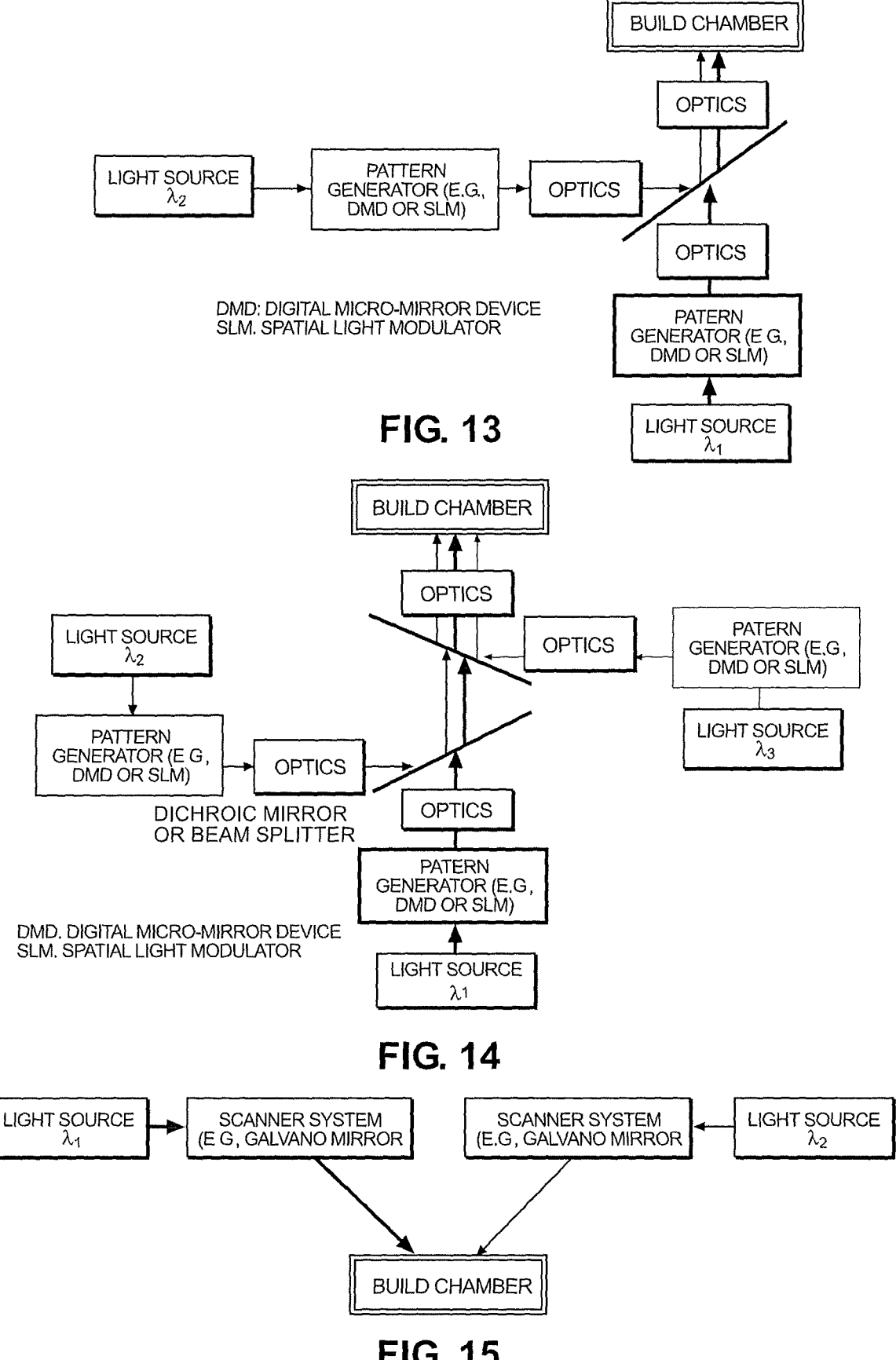
FIG. 13 shows an example of the present disclosure for an Embodiment of a Two-Wavelength Mask to enable Multi-wavelength Selective Photopolymerization.
FIG. 14 shows an example of the present disclosure for an Embodiment of a Three-Wavelength Mask to enable Multiwavelength Selective Photopolymerization.
FIG. 15 shows an example of the present disclosure for an Embodiment of a Multi-Wavelength Scanning Method to enable Multi-wavelength Selective Photopolymerization.

The optical masks are precisely aligned to avoid dislocations among different materials printing, FIG. 13 and FIG. 14 demonstrates the designs of a two-wavelength and a three-wavelength wavelength mask, respectively. Besides digital light processing setup using projection masks, the MmVP-AM of the present disclosure preferably can also employ a stereolithography setup with multi-wavelength scanning method as shown in FIG. 15. The present disclosure incorporates by reference herein U.S. Patent Publication No. 20180348646, Dec. 6, 2018, entitled MULTI WAVELENGTH STEREOLITHOGRAPHY HARDWARE CONFIGURATIONS in its entirety for all purposes. The present disclosure also incorporates by reference herein U.S. Pat. No. 9,676,963, Jun. 13, 2017, entitled METHODS OF PRODUCING THREE-DIMENSIONAL OBJECTS FROM MATERIALS HAVING MULTIPLE MECHANISMS OF HARDENING in its entirety for all purposes.

Design of Build Chamber

Another part of the Mm VP-CAM system of the present disclosure is preferably a smart build platform that could accommodate the microfluidic feeders and deliver the optical masks neatly.

Preferably, the online feeder is designed to allow changing the composition of the photopolymer by adding other substances such as photopolymer initiators and monomers in a timely manner to regulate the reaction rates. A system that could immediately mix photopolymer in the vat is preferred. A novel design of the Mm VP-CAM system and method of the present disclosure is to add a purging or suction system (e.g., capillary tube or absorptive sponge) on the resin surface to remove the liquid residual resins in a timely fashion. This layer-wise cleansing process provides two benefits: (1) help remove the possibility of residual curing by the transmitted light beam; (2) reduce the deformation induced by the gravity and surface drag forces imposed by the adsorbed liquid resin.

MmVP-CAM Method

Open-Loop Mode

Figure 16:
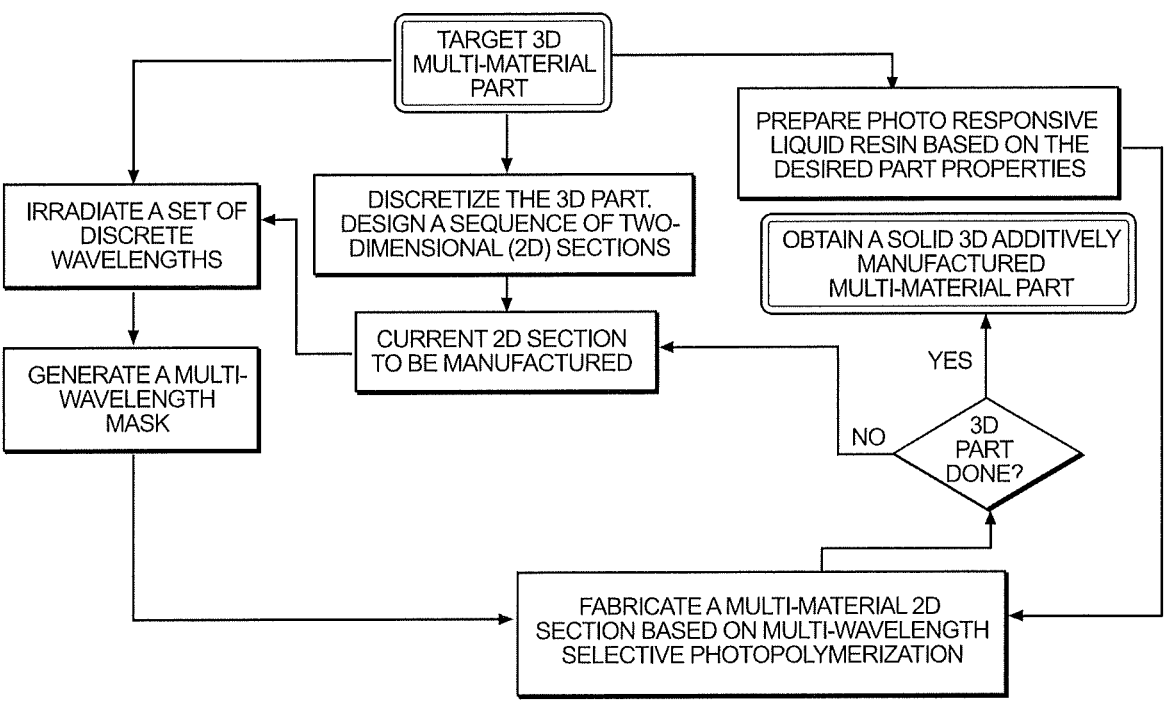
FIG. 16 shows an example of the present disclosure for an MmVP-CAM Process based on Multi-wavelength Selective Photopolymerization.

The Mm VP-CAM method of the present disclosure involves a fundamental multi-material 3D additive manufacturing method based on multi-wavelength selective photopolymerization as shown in FIG. 16. To attain process consistency and minimize adverse effects due to the mechanical switchover, a preferred embodiment is to use single-vat photopolymerization of localized materials with a projection mask of corresponding wavelength. Another preferred embodiment is that the photo responsive liquid resin can be set in a single vat with frequent rapid suction and refill. Some other preferred embodiments may combine the Mm VP-CAM system with a material switchover system such as multiple vats to develop a more versatile multi-material photopolymerization AM process which can cure a wider range of materials.

Real-Time Closed-Loop Mode

Figure 17:
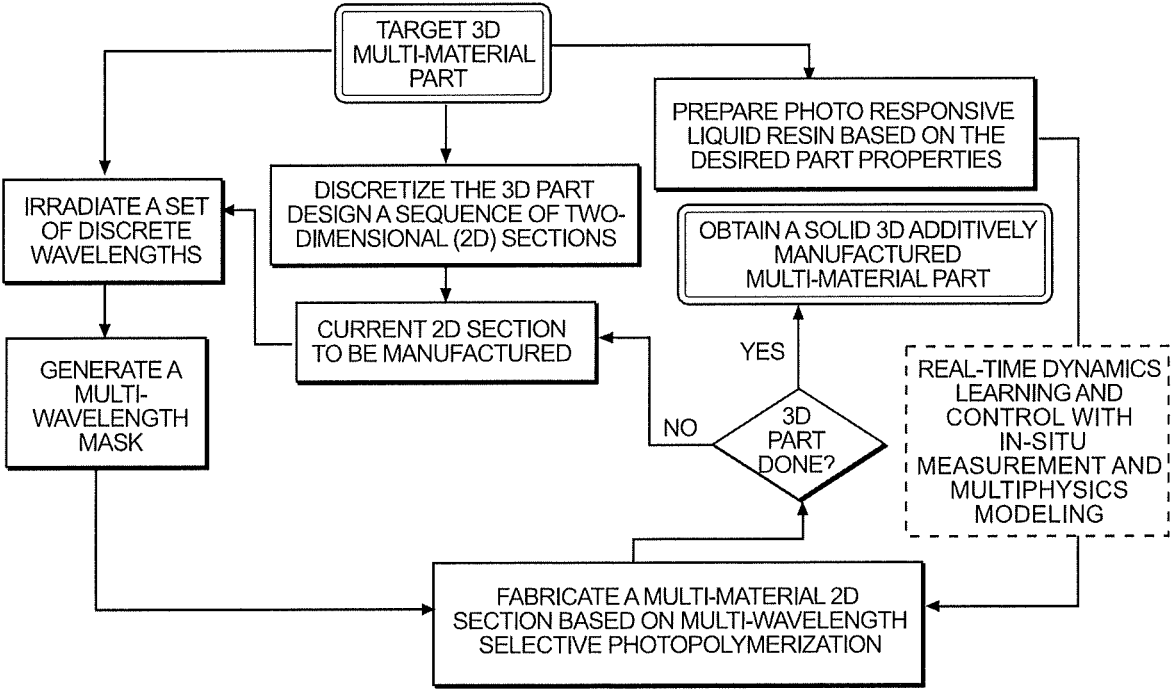
FIG. 17 shows an example of the present disclosure for an MmVP-CAM Process based on Multi-wavelength Selective Photopolymerization with Real-time Process Dynamics Learning and Control based on in-situ Measurement and Multiphysics Modeling.

An advanced MmVP-CAM system can be utilized by characterizing the multiple photopolymerization process dynamics based on in-situ measurement and monitoring and Multiphysics modeling as shown in FIG. 17. In-situ measurement methods include interferometry, ultrasonic transducer and other sensing and measuring techniques for measuring the part properties including the dimensions, refractive index, modulus, stress and strain. A machine learning strategy can be developed to learn the real-time AM process dynamics such as the photopolymerization process based on in-situ measurement feedback and Multiphysics modeling. The control algorithms include all applicable control methods such as feedback control and adaptive control.

An in-situ monitoring and measurement system such as an interferometry is preferably employed to visualize and study in-situ the polymerization process dynamics, which will provide guidance to adjust the formula of the material for optimal properties such as density and curing speed in the MmVP-CAM system and method of the present disclosure. It can also be used in the characterization of the developed materials for the subsequent AM process modeling, measurement and control.

For example, an in-situ interferometry sensor [51] is preferably used to monitor the materials synthesis along with evaluating the material-specific AM process dynamics. It offers real-time in-process characterization capability, ability of discern dark curing and provide guidance to formulating the materials with desired dark curing behavior, which can aid the AM part quality control (dimensional accuracy and residual stress).

Materials to be Used in MmVP-CAM

Another core of the MmVP-CAM method of the present invention is a novel material system consisting of complex and dynamic networks of concurrent molecular processes, which is preferably regulated by controlling multiple processes simultaneously [52]. The MmVP-CAM method of the present invention preferably will use a proper combination of initiators, monomers and other moieties to achieve maximum sensitivity and selectivity in each material zone and integrate them into target 3D multi-material parts. Sensitivity refers to the degree of curing the target group of material under its absorption wavelength. Selectivity refers to the ratio of the intended cured part of targeted material over the cured part of all kinds of materials under a single wavelength.

Several exemplary embodiments of the MmVP-CAM method of the present invention are set forth herein. However, the MmVP-CAM method of the present invention, is not limited to these approaches listed herein, but includes all approaches of developing a material that exhibits multiple selective wavelength absorption and multiple mutually exclusive curing.

1. All material zones are preferably based on radicals photopolymerization, but possess photoinitiators that generate monomer-selective radicals, thereby preventing cross-curing.
2. Each material zone preferably uses different mechanisms of photopolymerization, for examples, photo-induced anion-mediated polymerization at visible wavelength (e.g. 400-500 nm) and photo-induced radicals polymerization at ultraviolet wavelength (e.g., 365 nm) [50].
3. While printing each material zone, preferably use a photocleavable protecting group [52] to prevent the supposedly non-curable species from getting cured while curing a desired group of material under one wavelength. Then apply a different wavelength exposure to photo cleave the protected group.

To employ the new photopolymer AM process for multi-material parts, precursor materials must be selected or developed to be responsive to multiple wavelengths for selectively cure materials to localize structures and functions. The developed materials can enable local features cured with different monomers due to exclusively different wavelength absorption thus ultimately a heterogeneous structure with different properties (e.g., mechanical/optical/magnetic/electric properties).

The formulation of the resin depends mainly on the application requirements. Towards the end, a mixture of wavelength-selective chemical species can be formulated in various ways with a variety of materials and moieties to be used as a precursor material for the MmVP-CAM process of the present disclosure. To achieve high selectivity, it is preferred to formulate a photo resin with maximum absorption band that essentially should center on the light source wavelength and have a small full width half maximum (FWHM). Theoretically, each wavelength curable material should consist of photoinitior(s) that have an absorption maximum in the corresponding wavelength. Generally, the MmVP-CAM material preferred in the present disclosure is able to perform multiple selective wavelength absorption and multiple mutually exclusive curing.

The choices of monomers for use in the MmVP-CAM process of the present disclosure include but are not constrained to:

(1) Monomers with high penetration depth, tunable mechanical properties and proper cost such as (meth) acrylate based photopolymers.

(2) (Meth)acrylate based monomers or oligomers that have single or multi-functional reactive groups such as 2-Hydroxyethyl acrylate (HEA), poly(ethylene glycol) diacrylate (PEGDA), and trimethylolpropane ethoxylate triacrylate (TETA) [53].

(3) A hybrid formulation of multiple types of monomers that can achieve an optimal rate of reaction thus reduced curl distortion. Example combinations are acrylate/methacrylate, vinyl ether/epoxide. Such hybrid formulation could result in copolymers.

(4) An unlimited range of purely radical or purely cationic photopolymer mixtures.

(5) A formulation hybridizing both radical and cationic initiators and monomers. Due to the different polymerization modes, radical polymerizable monomers (e.g., acrylates) and cationic polymerizable monomers (e.g., epoxides) might not react with each other and form an interpenetrating network (IPN) rather than a copolymer [37]. Despite the potential problems caused by the incompatibility of the two types of monomers, there could be some benefits of covalently binding the acrylate and epoxide moieties, for example, a reduction in sensitivity to oxygen inhibition due to the extensive dark curing of epoxides.

(6) To increase the selectivity of localized curing of a desired type of material with the presence of multiple materials, proper photo protection groups (PPG) can be added in the material resin to protect other initiators and monomers getting cured under a localized selected wavelength [52].

(7) Stimulus responsive materials or active materials can be used in the formulation for multi-material 4D printing applications. For example, polyurethane can be used as one type among the other types of materials in the MmVP-CAM process of the present disclosure to print multi-material self-healing structures or multi-material energy storage devices for its mechanical/electrical stimulus responsiveness.

(8) The raw materials and moieties to form certain block copolymers can be used as a precursor material input for the MmVP-CAM process of the present disclosure to produce multi-material copolymeric parts.

(9) The precursor monomers preferably can use existing or newly developed materials including macromonomers. Examples are Carbon's elastomeric polyurethane and biodegradable photopolymerizable elastomers [54].

(10) For all the possible formulations, each formulation can vary in composition to adjust cross-link density, or to tune mechanical properties or to lower water uptake for certain applications.

Application Examples of the Developed
MmVP-CAM Method

Traditional VPMmAM processes are capable of only 1D multi-material AM and lack material choices, process efficiency, build accuracy and strength due to the nature of a discontinuous process caused by constrained optics configuration and mechanical switchover of materials. It is desirable to overcome these issues utilizing the MmVP-CAM system and method the present disclosure to achieve 3D multi-material fabrication in which a mixture of multiple precursor photo resins can be cured simultaneously and selectively. It will unveil in depth the process dynamics of multi-wavelength curing and the resulted part properties. The MmVP-CAM system and method the present disclosure can be integrated with existing processes to offer a more powerful hybrid VPAM process. The corresponding research on materials design and database for the MmVP-CAM system and method the present disclosure will establish a paradigm of transforming polymer science and engineering into advanced materials and manufacturing capabilities.

The multi-wavelength photo-responsive material mixture preferably can be selectively and simultaneously photocured into a heterogeneous hybrid material structure or component according to the MmVP-CAM system and method the present disclosure, which can be used in a range of sophisticated applications such as (but not limited to):

4D Printing

The fabrication multi-responsive actuators and robots.

The additively manufactured parts with stimuli-responsive material can be actuated in one or a combination of the physics fields such as temperature field, electrical field, magnetic field and optical field. For example, one can use the MmVP-CAM method of the present disclosure to print multiple shape memory polymers (SMP) into multi-material grippers that can grab objects and potentially become a drug delivery device with further development.

Another application example is to fabricate complex core-shell 3D structures with different materials in the core and shell which are responsive to different wavelengths. For example, a stimuli-responsive core-shell part can be printed by MmVP-CAM method of the present disclosure and programmed with desired deformations by magnetically induced area-specific molecular alignments.

Another promising application is to use the MmVP-CAM method of the present disclosure to fabricate smart membranes (responsive polymer membranes), which can sense environmental changes and are highly demanded by industries such as pharmaceuticals, medicine, molecular machines and data storage.

Bioprinting

Polymers have become appealing biomaterials to fabricate tissue scaffolds due to its design flexibility, tailor able properties and attainable biodegradability. The MmVP-CAM method of the present disclosure can be used fabricate novel scaffolds for on-demand patient-specific grafts (e.g., bone grafts) by hybridizing natural polymers and or synthetic polymer-based materials, which can benefit from different materials and offer bioactivity, mechanical strength and controllable degradation.

The MmVP-CAM method of the present disclosure can also be used to print a mix of photo-responsive moieties including commonly used hydrogel with various crucial biological molecules such as peptides, amino acid, oligonucleotides and neurotransmitters to print multi-material and multifunctional biological tissues which will bring bioprinting one step closer to a practical way of realizing the magic of printed organs that usually comprises multi-material but currently cannot be printed due to the lack of an efficient and precise AM process with full capability in handling multi-material especially multiple small biological molecules.

Development and Fabrication of Meta Materials and Functional Graded Materials

The MmVP-CAM method of the present disclosure can be used fabricate functional graded mechanical metamaterials by enabling one more design dimension with material variability embedded in the structured architecture. The developed process can advance the emerging mechanical metamaterials technology to achieve novel mechanical properties unprecedented in nature, such as negative Poisson's ratio, bistability, and tailored stiffness.

Additive Manufacturing of Multi-Functional Systems

The MmVP-CAM method of the present disclosure can also be used to fabricate multi-functional devices that inherently comprise of various materials and could not been easily made by traditional single-material AM. For example, it can be used to fabricate heterogeneous microfluidics components (e.g., microvalves) for drug delivery, biochips, tissue engineering, soft robots, water treatment and other separation and purification applications.

Be Employed with Material Switch-Over Based Methods for Vat Photopolymerization Based Multi-Material AM Unlike traditional multi-feedstock switchover based multi-material AM, the MmVP-CAM method of the present disclosure offers a non-mechanical continuous multi-material vat photopolymer AM process. It can facilitate the development of a more efficient and versatile vat photopolymerization multi-material AM (VPMmAM) method.

The MmVP-CAM method of the present disclosure preferably can be readily combined with a conventional material switchover system to achieve desired maximal process continuity during multi-material manufacturing for enhanced between-material connectivity and mechanical properties. An extension of the MmVP-CAM system can lead to a general VPMmAM process that optimally uses the MmVP-CAM method of the present disclosure to cure regions with disparate wavelengths responsive materials at one vat and switches to other vats with materials that are responsive to the same wavelengths as these are in the previous vats.

Extension to Two-Photon or Multi-Photon Vat Photopolymerization Based Multi-Material AM The MmVP-CAM method of the present disclosure can also be extended to upgrade other kinds of VPAM process based on two photon polymerization (TPP) or multi-photon polymerization (MPP) which are highly precise and capable of nanoscale fabrication but currently not able to handle multiple materials printing due to its optical configuration constraints.

REFERENCES

The present disclosure incorporates by reference herein the references set forth below in their entireties for all purposes.

1. 3D Printing and Additive Manufacturing State of the Industry Annual Worldwide Progress Report. 2017, Wohlers Associates: Fort Collins, CO
2. Huanga, C., et al., Controlled molecular self-assembly of complex three-dimensional structures in soft materials. Proceedings of the National Academy of Sciences, 2018. 115(1).
3. Gittard, S. D., et al., Fabrication of microscale medical devices by two-photon polymerization with multiple foci via a spatial light modulator. Biomedical Optics Express, 2011. 2(11): p. 3167-3178.

4. Kelemen, L., P. Ormos, and G. Vizsnyiczai, Two-photon polymerization with optimized spatial light modulator. Journal of the European Optical Society: Rapid Publications, 2011. 6.

5. Lin, Y., et al., Soft lithography based on photolithography and two-photon polymerization. Microfluidics and Nanofluidics, 2018. 22(97).

6. Sugioka, K., T. Matsuda, and Y. Ito, Photofabrication, in Photochemistry for Biomedical Applications. 2018, Springer, Singapore. p. 51-82, 7. Bourdon, L., et al., Improvements in resolution of additive manufacturing: advances in two-photon polymerization and direct-writing electrospinning techniques. ACS Biomaterials Science & Engineering, 2018.

8. Thiel, M., et al., Direct laser writing of three-dimensional submicron structures using a continuous-wave laser at 532 nm. Applied Physics Letters, 2010. 97(22).

9. Delrot, P., et al., Single-photon three-dimensional microfabrication through a multimode optical fiber. Opt Express, 2018. 26(2): p. 1766-1778.

10. Ehab Saleh, et al., 3D Inkjet Printing of Electronics Using UV Conversion. Advanced Materials Technologies, 2017. 2(10): p. 1700134, 11. Lis, M., et al., Polymer Dielectrics for 3D-Printed RF Devices in the Ka Band.
Advanced Materials Technologies, 2016. 1(2): p. 1600027.

12. Tumbleston, J. R., et al., Continuous liquid interface production of 3D objects. Science, 2015. 347(6228): p. 1349-1352.

13. Shusteff, M., et al., One-step volumetric additive manufacturing of complex polymer structures. Science Advances, 2017. 3(12).

14. Naik, D. L. and R. Kiran, On anisotropy, strain late and size effects in vat photopolymerization based specimens. Additive Manufacturing, 2018. 23: p. 181-196.

15. Lalevée, J. and J.-P. Fouassier, Photopolymerisation Initiating Systems. Polymer Chemistry Series. Vol. 29. 2018: Royal Society of Chemistry.

16. Shusteff, M., Volumetric Additive Manufacturing of Polymer Structures by Holographically Projected Light Fields, in Department of Electrical Engineering and Computer Science. 2017, Massachusetts Institute of Technology.

17. McGregor, D. J., S. Tawfick, and W. P. Kin, Mechanical Properties of Hexagonal Lattice Structures Fabricated Using Continuous Liquid Interface Production Additive Manufacturing. Additive Manufacturing, 2018.

18. de Beer, M. P., et al., Rapid, continuous additive manufacturing by volumetric polymerization inhibition patterning. Science Advances, 2019. 5(1): p. eaau8723.

19. Kowsari, K., et al., Photopolymer formulation to minimize feature size, surface roughness, and stair-stepping in digital light processing-based three-dimensional printing. Additive Manufacturing, 2018. 24: p. 627-638.

20. Zhang, Y., Empirical process planning for exposure controlled projection lithography, in Mechanical Engineering. 2016, Georgia Institute of Technology: Atlanta, USA.

21. Bhattachadee, N., et al., Desktop-Stereolithography 3D-Printing of a Poly(dimethylsiloxane)-Based Material with Sylgard-184 Properties. Adv Mater, 2018. 30(22): p. e1800001.

22. Zhao, X., Process Planning For Thick Film Mask Projection Micro Stereolithography, in Mechanical Engineering. 2009, Georgia Institute of Technology: Atlanta, USA.

23. Wu, J., Constitutive Modeling of Photopolymerization and its Application to 3D Printing, in School of Mechanical Engineering. 2018, Georgia Institute of Technology: Atlanta, GA, USA.

24. Mitteramskogler, G., et al., Light curing strategies for lithography-based additive manufacturing of customized ceramics. Additive Manufacturing, 2014. 1-4: p. 110-118.

25. de Miguel, G., et al., Linewidth and Writing Resolution, in Three-Dimensional Microfabrication Using Two-photon Polymerization. 2016. p. 190-220.

26. Borrello, J., et al., 3D Printing a Mechanically-Tunable Acrylate Resin on a Commercial DLP-SLA Printer. Additive Manufacturing, 2018.

27. Zhao, X. and D. W. Rosen, An implementation of real-time feedback control of cured part height in Exposure Controlled Projection Lithography with in-situ interferometric measurement feedback. Additive Manufacturing, 2018. 23: p. 253-263.

28. Wen, M. and A. V. McCormick, A Kinetic Model for Radical Trapping in Photopolymerization of Multifunctional Monomers. Macromolecules, 2000. 33: p. 9247-9254.

29. Scott, T. F., et al., Two-Color Single-Photon Photoinitiation and Photoinhibition for Subdiffraction Photolithography. Science, 2009. 325(5): p. 913-917.

30. Andrew, T. L., H.-Y. Tsai, and R. Menon, Confining Light to Deep Subwavelength Dimensions to Enable Optical Nanopatterning. Science, 2009. 324(5929): p. 917-921.

31. Cao, Y., et al., High-photosensitive resin for super-resolution direct-laser-writing based on photoinhibited polymerization. Optics Express, 2011. 19(20): p. 19486-19494.

32. Bowman, C. N. and C. J. Kloxin, Toward an enhanced understanding and implementation of photopolymerization reactions. AIChE Journal, 2008. 54(11): p. 2775-2795.

33. Ou, J., et al., Cilllia—3D Printed Micro-Pillar Structures for Surface Texture, Actuation and Sensing, in Proceedings of the 2016 CHI Conference on Human Factors in Computing Systems—CHI '16. 2016. p. 5753-5764.

34. Liu, Y., et al., Soft conductive micropillar electrode at rays for biologically relevant electrophysiological recording. Proceedings of National Academy of Sciences, 2018. 115(46): p. 11718-11723.

35. Gu, M., X. Li, and Y. Cao, Optical storage arrays: a perspective for future big data storage. Light: Science & Applications, 2014. 3(5): p. e177-e177.

36. Borrello, J., et al., 3D Printing a Mechanically-Tunable Acrylate Resin on a Commercial DLP-SLA Printer. Additive Manufacturing, 2018.

37. Ligon, S. C., et al., Polymers for 3D Printing and Customized Additive Manufacturing. Chemical Reviews, 2017. 117(15): p. 10212-10290, 38. Lopes, L. R., A. F. Silva, and O. S. Carneiro, Multimaterial 3D printing: The relevance of materials affinity on the boundary interface performance. Additive Manufacturing, 2018. 23: p. 45-52.

39. Gibson, I., D. W. Rosen, and B. Stucker, Additive Manufacturing Technologies: 3D Printing, Rapid Prototyping, and Direct Digital Manufacturing. 2nd ed. 2014: Springer-Verlag New York. XXI, 498.

40. Janusziewicz, R., et al., Layerless fabrication with continuous liquid interface production. Proceedings of the National Academy of Sciences, 2016. 113(42): p. 11703-11708.

41. Shusteff, M., Volumetric Additive Manufacturing of Polymer Structures by Holographically Projected Light Fields, in Department of Electrical Engineering and Computer Science. 2017, Massachusetts Institute of Technology.

42. Kelly, B. E., et al. Computed Axial Lithography for Rapid Volumetric 3D Additive Manufacturing, in Solid Freeform Fabrication Symposium—An Additive Manufacturing Conference. 2017. Austin, TX 43. Ge, Q., et al., A digital light processing 3D printer for fast and high-precision fabrication of soft pneumatic actuators. Sensors & Actuators: A. Physical, 2018. 273: p. 285-292.

44. Zhou, C., et al. Development of a Multi-material Mask-Image-Projection-based Stereolithography for the Fabrication of Digital Materials. in Solid Freeform Fabrication Symposium. 2011. Austin, TX 45. Choi, J.-W., H.-C. Kim, and R. Wicker, Multi-material stereolithography. Journal of Materials Processing Tech, 2011. 211(3): p. 318-328.

46. Choi, J.-W., E. MacDonald, and R. Wicker, Multi-material microstereolithography. The International Journal of Advanced Manufacturing Technology, 2009. 49(5-8): p. 543-551.

47. Sugioka, K., T. Matsuda, and Y. Ito, Photofabrication, in Photochemistry for Biomedical Applications. 2018, Springer, Singapore. p. 51-82.

48. Bourdon, L., et al., Improvements in resolution of additive manufacturing: advances in two-photon polymerization and direct-writing electrospinning techniques. ACS Biomaterials Science & Engineering, 2018.

49. Kaupp, M., et al., Wavelength selective polymer network formation of end-functional star polymers. Chem Commun (Camb), 2016. 52(9): p. 1975-8.

50. Zhang, X., et al., Wavelength-Selective Sequential Polymer Network Formation Controlled with a Two-Color Responsive Initiation System. Macromolecules, 2017. 50(15): p. 5652-5660.

51. Zhao, X. and D. W. Rosen, Real-time interferometric monitoring and measuring of photopolymerization based stereolithographic additive manufacturing process: sensor model and algorithm. Measurement Science and Technology, 2017. 28(1).

52. Hansen, M. J., et al., Wavelength-selective cleavage of photoprotecting groups:
strategies and applications in dynamic systems. Chem Soc Rev, 2015. 44(11): p. 3358-77.

53. Kowsari, K., et al., Photopolymer formulation to minimize feature size, surface toughness, and stair-stepping in digital light processing-based three-dimensional printing. Additive Manufacturing, 2018. 24: p. 627-638.

54. Wang, Y., M. R. Kibbe, and G. A. Ameer, Photo-crosslinked Biodegradable Elastomers for Controlled Nitric Oxide Delivery. Biomaterials science, 2013. 1(6): p. 625.

What is claimed is:

1. A system for single photon absorption based vat photopolymerization additive manufacturing of a three-dimensional part comprising a first two-dimensional (2D) section and one or more subsequent 2D sections with photoinhibition induced curb and photoexcitation induced cure, comprising:

a build chamber;

a multi-wavelength light engine having first and second light beam sources producing first and second light beams of discrete wavelengths, a curing mask generator for shaping the first light beam into a curing mask, a curbing mask generator for shaping the second light beam into a curbing mask, wherein the curing mask generator and the curbing mask generator modulate spatially light from the first and second light beams, respectively, in terms of wavelength, intensity, phase and/or polarization;

an optics assembly integrated with the build chamber, the multi-wavelength light engine, the curing mask generator and the curbing mask generator, wherein the optics assembly collimates the curing mask and the curbing mask to be aligned with the same optical axis before being delivered to a target resin material in the build chamber;

one or more sensors in communication with a controller for real-time in-situ monitoring and closed-loop control of the system, wherein the controller uses feedback from the one or more sensors to control the curing mask generator and the curbing mask generator to modulate spatially light from the first and second light beams, respectively, in terms of wavelength, intensity, phase and/or polarization with respect to the additive manufacturing of the one or more subsequent 2D sections.

2. The system of claim 1 wherein the the curing mask of desired cross-section is aligned coaxially with the curbing mask to deliver a topological field that is polymerized throughout the target cross-section.

3. The system of claim 1 wherein exposure parameters of intensity and duration for the curing mask and the curbing mask and formulation of the target resin material are set to enable confined photopolymerization for curing 2D cross-sections to form 3D small features and parts.

4. The system of claim 1 wherein diffraction-limited photo-curing of small features of submicron to a few microns is minimized.

5. The system of claim 1 wherein each of the curing mask and the curbing mask varies in one or more of shape, wavelength, intensity and duration depending on the target's properties of geometry and mechanics.

6. The system of claim 1, wherein the build chamber comprises a smart build chamber comprising one or more of the following, one or more microfluidic feeders wherein each microfluidic feeder is controlled by the controller for real-time changing the composition of the photopolymer in each 2D section by adding other substances such as photopolymer initiators and monomers in a timely manner to regulate the reaction rates; a mixer for mixing photopolymer; one or more optical mask delivery devices; a purging and/or suction system on the surface of the 2D section to remove liquid residual resins in a timely fashion for minimizing residual curing by a transmitted light beam and to reduce deformation induced by gravity and surface drag forces imposed by adsorbed liquid resin.

7. The system of claim 1 wherein the one or more sensors are selected from a group comprising an interferometry sensor, an ultrasonic sensor, a strain sensor, a modulus sensor and a refractive index sensor.

8. The system of claim 1 wherein the controller uses real-time in-situ measurements from the one or more sensors to control operation of the first light-beam and the second light beam.

9. The system of claim 1 wherein each of the curing mask generator and the curbing mask generator comprises a programmable digital light projector selected from the group of a Digital Micromirror Device (DMD) or a Spatial Light Modulator (SLM).

* * * * *